United States Patent
Ito

(10) Patent No.: US 9,515,355 B2
(45) Date of Patent: Dec. 6, 2016

(54) METHOD FOR SORTING USED SECONDARY BATTERY, REBUILT BATTERY PACK, VEHICLE AND BATTERY OPERATED DEVICE INCORPORATING SAME, AND METHOD FOR MANUFACTURING REBUILT BATTERY PACK

(75) Inventor: Masanori Ito, Toyohashi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 780 days.

(21) Appl. No.: 13/637,763

(22) PCT Filed: Mar. 31, 2010

(86) PCT No.: PCT/JP2010/055846
§ 371 (c)(1),
(2), (4) Date: Sep. 27, 2012

(87) PCT Pub. No.: WO2011/121755
PCT Pub. Date: Oct. 6, 2011

(65) Prior Publication Data
US 2013/0015702 A1 Jan. 17, 2013

(51) Int. Cl.
*B60L 1/00* (2006.01)
*B60L 3/00* (2006.01)
*H02G 3/00* (2006.01)
(Continued)

(52) U.S. Cl.
CPC ........... *H01M 10/482* (2013.01); *H01M 10/54* (2013.01); *H01M 10/0525* (2013.01); *H01M 10/30* (2013.01); *H01M 10/486* (2013.01); *Y02T 10/7011* (2013.01); *Y02W 30/84* (2015.05)

(58) Field of Classification Search
USPC .......... 307/9.1; 320/128, 132, 106; 429/430, 429/434; 414/274
See application file for complete search history.

(56) References Cited

U.S. PATENT DOCUMENTS

2001/0028238 A1* 10/2001 Nakamura ......... G01R 31/3662
320/132
2004/0113588 A1* 6/2004 Mikuriya .......... H01M 10/4257
320/128

(Continued)

FOREIGN PATENT DOCUMENTS

JP 7-147165 6/1995
JP 10-289729 10/1998

(Continued)

*Primary Examiner* — Rexford Barnie
*Assistant Examiner* — Xuan Ly
(74) *Attorney, Agent, or Firm* — Finnegan, Henderson, Farabow, Garrett & Dunner, LLP

(57) ABSTRACT

Disclosed are a method for adequately sorting used secondary batteries; a rebuilt battery pack that incorporates the used batteries sorted by the sorting method and have identical characteristics; a vehicle and a battery operated device which use the rebuilt battery pack; and a method for manufacturing a rebuilt battery pack which employs used batteries having identical characteristics. The method for sorting used secondary batteries includes a resistance measurement step for measuring the battery resistance of a battery the characteristics of which show a bathtub curve with respect to the period of use. The method further includes a resistance distinguishing step for distinguishing whether the battery resistance of the battery is greater or less than a period threshold value for identifying to which one of the following periods the battery belongs: an initial-stage high-resistance period, and end-stage high-resistance period, and a middle-stage low-resistance period.

18 Claims, 10 Drawing Sheets

(51) Int. Cl.
*H01M 10/48* (2006.01)
*H01M 10/54* (2006.01)
*H01M 10/0525* (2010.01)
*H01M 10/30* (2006.01)

(56) References Cited

U.S. PATENT DOCUMENTS

2007/0108946 A1 5/2007 Yamauchi et al.
2008/0290833 A1 11/2008 Hayashi
2009/0011327 A1 1/2009 Okumura et al.
2010/0047684 A1* 2/2010 Okumura ............. H01M 2/10
　　　　　　　　　　　　　　　　　　　　　　　429/156

FOREIGN PATENT DOCUMENTS

| JP | 2008-293703 | 12/2008 |
| JP | 2009-16162 | 1/2009 |
| WO | WO 03/069715 A1 | 8/2003 |

* cited by examiner

METHOD FOR SORTING USED SECONDARY BATTERY, REBUILT BATTERY PACK, VEHICLE AND BATTERY OPERATED DEVICE INCORPORATING SAME, AND METHOD FOR MANUFACTURING REBUILT BATTERY PACK

CROSS-REFERENCE TO RELATED APPLICATIONS

This application is a national phase application of International Application No. PCT/JP2010/055846, filed Mar. 31, 2010, the content of which is incorporated herein by reference.

TECHNICAL FIELD

The present invention relates to a method for sorting or classifying a used secondary battery, a rebuilt battery pack utilizing the used secondary battery which is sorted by the sorting method, and a vehicle and a battery operated device incorporating the same. Moreover, the present invention relates to a method for manufacturing the rebuilt battery pack utilizing the used secondary battery.

BACKGROUND ART

By recent research and development, a hybrid car and an electric car are practically used. As a secondary battery for the cars, there is utilized a high capacity and high power secondary battery (hereinafter referred to as a battery) such as a nickel-metal hydride secondary battery or a lithium ion secondary battery.

In the utilization of the secondary battery in earnest, a large number of used secondary batteries are generated by the scrap of a car, an exchange of a battery (a battery unit) or the like. However, it can be supposed that some used secondary batteries have a failure, have defective characteristics, or run down, but include a large number of batteries still usable. In respect of an environmental demand, an effective utilization of resources or energy for manufacturing a battery and the like, it is required to properly recycle the used secondary battery. Moreover, there can also be supposed the case in which a brand-new battery is not utilized but a used secondary battery is used in order to remove a particular battery that has a failure or is greatly deteriorated from a battery unit and to replace the battery with another one.

SUMMARY OF INVENTION

Problems to be Solved by the Invention

Even if each used secondary battery is still usable, it is predicted to pass through various histories while it is manufactured and is then collected as a used item. Although there is a manufacturing variation in the characteristics of the battery, the characteristics and the degree of deterioration are greatly varied depending on a difference in a subsequent history of use (for example, used years or a used mode (whether or not charge or discharge is carried out by supplying plenty of large current, or a thermal environment such as a cold district or a district having intense heat)).

On the other hand, single battery is rarely used in a car or the like. A plurality of (for example, twelve) used secondary batteries is collected to reconstitute (rebuild) a battery pack (a small battery pack), and furthermore, a plurality of battery packs is used to reconstitute (to rebuild) a battery unit (a large battery pack) and the battery unit is mounted on a car and is thus used in many cases.

In the case in which used secondary batteries having the same article number (model number) are collected to reconstitute a battery pack, however, behavior is varied between the batteries or the battery packs in charging or discharging if the characteristics or the degrees of the deterioration of the used secondary batteries which are utilized are different from each other. For this reason, there is a risk that a proper charge or discharge cannot be carried out or the battery might be diagnosed as having a failure according to circumstances. Alternatively, there is also a risk that some of the batteries might run down in an early stage and the rebuilt battery pack itself might be thus unusable in the early stage though the battery pack is formed (rebuilt).

The present invention was made in view of the foregoing circumstances. It is an object of the present invention to provide a proper method for sorting a used secondary battery. Moreover, it is an object to provide a rebuilt battery pack using a used secondary battery sorted by the sorting method and having uniform characteristics. Furthermore, it is an object to provide a vehicle and a battery operated device incorporating the same. In addition, it is an object to provide a method for manufacturing a rebuilt battery pack utilizing a used secondary battery and having uniform characteristics of each battery.

Means of Solving the Problems (1) To achieve the above purpose, one aspect of the invention provides a method for sorting a used secondary battery having been already used, the battery having characteristics such that in an initial stage of a usable period, a battery resistance is gradually reduced and an initial-stage high-resistance period having a relatively high battery resistance appears, in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein the method includes: a resistance measuring step of measuring the battery resistance of the used secondary battery; and a resistance distinguishing step of distinguishing whether the battery resistance of the used secondary battery is high or low as compared with a period threshold identifying whether the used secondary battery is present in one of the initial-stage high-resistance period or ending-stage high-resistance period and the middle-stage low-resistance period.

It has been found that a bathtub curve is nearly drawn by an observation of aging of a battery resistance (a resistance of a battery through the DC-IR method or the AC-IR method) in the case of using a battery such as an Ni-MH secondary battery or a lithium ion secondary battery which has a high capacity and high power for a car or the like.

In other words, in the initial stage, the battery resistance is relatively high and is decreased with the time elapsed. Although this period depends on a using (operating) situation in a secondary battery to be used in a car, for example, it continues for approximately several months to two years.

In the subsequent middle stage, the battery resistance is relatively low and is not varied but is almost constant even if the time is elapsed. This period continues for approximately 5 to 10 years in the secondary battery to be used in the car, for example.

In the subsequent ending stage, furthermore, the battery resistance is increased with the time elapsed and is thus raised relatively high. This period continues for approximately 1 to 2 years in the secondary battery to be used in the car, for example. When the battery resistance exceeds a maximum allowable resistance value, then, the battery is assumed to run down.

On the other hand, referring to the used secondary battery having the characteristics described above, the sorting method uses the battery resistance of the used secondary battery to sort whether the used secondary battery to be distinguished is present in one of either an initial-stage high-resistance period having a high battery resistance (hereinafter referred to as an A period) or an ending-stage high-resistance period (hereinafter referred to as a C period) and a middle-stage low-resistance period having a low battery resistance (hereinafter referred to as a B period) at the resistance distinguishing step. Consequently, it is possible to easily and properly sort the used secondary battery which is present in the initial-stage high-resistance period and the ending-stage high-resistance period or the middle-stage low-resistance period.

Examples of the battery resistance of the secondary battery to be used for the sorting include a DC resistance of a battery which is measured by the DC-IR method or an AC resistance of the battery which is measured by the AC-IR method.

Moreover, a period threshold to be set is smaller than a minimum value of a battery resistance that can be taken by a battery at the beginning of use and is equal to or greater than a maximum value of a battery resistance that can be taken by the battery in a middle-stage low-resistance value period.

(2) Preferably, the aforementioned method for sorting the used secondary battery further includes a period distinguishing step of distinguishing whether the used secondary battery having the higher battery resistance than the period threshold belongs to the initial-stage high-resistance period or the ending-stage high-resistance period based on used history information of the used secondary battery.

Referring to a battery having a higher battery resistance than the period threshold, that is, a used secondary battery present in the initial-stage high-resistance period (the A period) or the ending-stage high-resistance period (the C period), the method for sorting a used secondary battery distinguishes whether the used secondary battery belongs to the initial-stage high-resistance period (the A period) or the ending-stage high-resistance period (the C period) based on used history information about the used secondary battery at the period distinguishing step.

Referring to the used secondary battery having the characteristics described above, consequently, the used secondary battery can properly identify any of the three periods (stages), thereby carrying out a processing such as reuse or disposal appropriately.

Also in the case in which a plurality of used secondary batteries is collected to reconstitute a battery pack, the used secondary batteries in the same stage (period) can be collected to constitute the battery pack, and it is possible to constitute a battery pack having stable characteristics by preventing a drawback such as overvoltage or overcharge applied to some of the batteries from being caused by a variation in characteristics in the batteries.

The used history information includes a date of production of a battery, a date of beginning of use of a battery, a using period of a battery, a working time (an actual used time) of a battery and the like.

In the case in which the used secondary battery is utilized for a car, furthermore, it is also possible to utilize, as the used history information of the used secondary battery, a travelling distance (mileage) of the car for a period in which the battery is used.

(3) Furthermore, preferably, the aforementioned method for sorting a used secondary battery further includes a resistance classifying step of further classifying the used secondary battery having the lower battery resistance than the period threshold into a plurality of layers based on a magnitude of the battery resistance.

Even the used secondary batteries belonging to the same middle-stage low-resistance period (the B period) also have a variation in the value of the battery resistance.

On the other hand, the method for sorting a battery further classifies the used secondary battery based on the magnitude of the battery resistance at the resistance classifying step if the used secondary battery has a lower battery resistance than the period threshold, that is, the used secondary battery belongs to the middle-stage low-resistance period (the B period). Consequently, the used secondary batteries belonging to the middle-stage low-resistance period can be classified further finely. Thus, it is possible to collect the used secondary batteries having more similar characteristics, respectively.

(4) In the aforementioned method for sorting a used secondary battery, preferably, the used secondary battery has characteristics such that in a usable temperature range of the battery, a DC resistance of the battery is increased as a temperature of the battery is lowered, and a change in the DC resistance due to the temperature is small in a high temperature region having a relatively high temperature, and a change in the DC resistance due to the temperature is large in a low temperature region having a relatively low temperature, and the DC resistance in the low temperature region is equal to or more than three times as high as the DC resistance in the high temperature region, and the DC resistance is acceleratively increased as the temperature of the battery is lowered in a middle temperature region between the high temperature region and the low temperature region, and the method includes a discharging-time classifying step of further classifying, in an environment of the middle temperature region, the used secondary battery having the smaller battery resistance than the period threshold or classified in the resistance classifying step, into a plurality of layers based on a length of a discharging time of constant power discharging or constant current discharging which is started at a predetermined discharging start voltage within a highest voltage range defined as an uppermost $\frac{1}{5}$ of an allowable voltage range ranging from a minimum allowable voltage to a maximum allowable voltage, and ended at a predetermined discharging end voltage within a lowest voltage range defined as a lowermost $\frac{1}{5}$ of the allowable voltage range.

According to the method for sorting a battery, the used secondary battery of the B period or classified in the resistance classifying step is further classified into a plurality of layers or classes based on the length of the discharging time of constant power discharging or constant current discharging which is ended at the discharging end voltage in the middle temperature region environment in which the DC resistance of the battery is slightly higher than that in the high temperature region.

For this reason, it is possible to properly detect a difference in battery characteristics in a middle temperature region environment having a relatively low temperature. The difference in a battery characteristic is a difference such that the one cannot be found by the battery resistance (by the DC-IR method or the AC-IR method). Thus, the respective batteries can be classified. Therefore, the used secondary battery can be classified further finely so that the used secondary batteries having more similar characteristics can be collected, respectively.

In particular, it is possible to collect the batteries having the similar characteristics in the middle temperature region environment in which the temperature is relatively low and the DC resistance of the battery is slightly raised thorough the classification. In the actual use of the battery in the middle temperature region environment having the relatively low temperature, thus, the difference in the characteristic between the batteries is unlikely to appear and it is possible to easily constitute a battery pack having stable characteristics or a battery unit (a large battery pack) made by combining or assembling those battery packs.

In a nickel-metal hydride secondary battery or an Li ion secondary battery having a using temperature range of approximately −30° C. to 60° C., a range of approximately −20° C. to 10° C. corresponds to the middle temperature region. In this case, moreover, a range of −30° C. to −20° C. corresponds to the low temperature region and a range of 10° C. to 60° C. corresponds to the high temperature region. Furthermore, the DC resistance in the low temperature range has a three-fold value or more as compared with the high temperature region.

In addition, it is preferable to select, as a discharging start voltage, a proper voltage value within a highest voltage range, that is uppermost ⅕ of the range, a topmost one of five ranges obtained by dividing, into five parts, an allowable voltage range from a minimum allowable voltage to a maximum allowable voltage. The reason is that it is possible to reflect, on the discharging time, the characteristics of the battery in a relatively large charging quantity by starting to discharge with a value close to the maximum allowable voltage (a full charging (SOC: 100%) voltage). Accordingly, it is particularly preferable that the discharging start voltage has a voltage value of the maximum allowable voltage (the full charging (SOC: 100%)).

As the discharging end voltage, moreover, it is preferable to select a proper voltage value within a lowest voltage range, that is lowermost ⅕ of the range, a lowermost one of five ranges obtained by dividing, into five parts, the allowable voltage range from the minimum allowable voltage to the maximum allowable voltage. The reason is that it is possible to reflect, on the discharging time, the characteristics of the battery in a relatively small charging quantity by discharging to have a value close to the minimum allowable voltage (a full discharging (SOC: 0%) voltage)). Accordingly, it is particularly preferable that the discharging end voltage has a voltage value of the maximum allowable voltage (the full discharging (SOC: 0%)).

Furthermore, it is preferable that a magnitude of a current to flow in a constant power discharge or a constant current discharge is within a range of the current to flow in the case of the actual use of the battery, for example, is equal to or smaller than a maximum current which can flow in the case in which the battery is mounted on a car. Furthermore, it is preferable that the magnitude is equal to or smaller than 10 C. When a large current is caused to flow, the discharge ends in a short time. Consequently, precision in the measurement of the discharging time is reduced so that a comparison is unlikely to be properly carried out. Moreover, there is a great influence of a voltage drop due to a resistance of an electrolytic solution which is caused by the discharge of the large current. Thus, it is hard to grasp a change in the discharging time which is caused by a deterioration in the characteristic of the battery electrode.

Accordingly, it is preferable that the method for sorting a used secondary battery described above includes a discharging-time classifying step of further classifying, into a plurality of layers, a used secondary battery having the smaller battery resistance than the period threshold based on a length of a discharging time required for reaching the minimum allowable voltage by the constant power discharge or the constant current discharge with a current of 10 C or less in the full charging state in an environment of 10° C. to −20° C.

In addition, the sorting method has a wide range of a voltage to be changed through a discharge. Therefore, a difference in the discharging time caused by a difference in the characteristics of the battery appears greatly so that the respective batteries can be classified more properly.

(5) Furthermore, preferably, in a rebuilt battery pack reconstituted by collecting a plurality of used secondary batteries having been already used, the batteries has characteristics such that in an initial stage of a usable period, a battery resistance is gradually reduced and an initial-stage high-resistance period having a relatively high battery resistance appears, in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein each of the used secondary batteries is distinguished to be in the middle-stage low-resistance period by the method for sorting a used secondary battery in the configuration (1).

In the rebuilt battery pack, a battery distinguished to be in the middle-stage low-resistance period (B period) through the sorting is used. Therefore, the batteries used in the battery pack have a small variation in the characteristics and it is possible to prevent a drawback such as overvoltage or overcharge applied to some of the batteries, which is caused by the variation in the characteristics between the batteries. In addition, the battery of the B period is used. Even if the battery is used, the characteristics of the respective batteries are less changed so that the rebuilt battery pack having a stable characteristic can be obtained.

Moreover, the battery of the C period is not mixed. Therefore, it is possible to prevent some of the batteries in the rebuilt battery pack from running down in an early stage and to prevent a drawback such that the rebuilt battery pack cannot be used in the early stage.

The rebuilt battery pack includes a battery pack obtained by collecting a plurality of batteries, and furthermore, a battery unit (a large battery pack) obtained by assembling a plurality of battery packs.

(6) Furthermore, preferably, in a rebuilt battery pack reconstituted by collecting a plurality of used secondary batteries having been already used, the batteries has characteristics such that in an initial stage of a usable period, a battery resistance is gradually reduced and an initial-stage high-resistance period having a relatively high battery resistance appears, in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein each of the used secondary batteries is distinguished to be in the initial-stage high-resistance period by the method for sorting a used secondary battery in the configuration (2).

In the rebuilt battery pack, a battery distinguished to be in the initial-stage high-resistance period (A period) through the sorting is used. Therefore, the batteries used in the battery pack have a small variation in the characteristics and it is possible to prevent a drawback such as overvoltage or overcharge applied to some of the batteries, which is caused by the variation in the characteristic between the batteries.

Moreover, the battery of the C period is not mixed. Therefore, it is possible to prevent some of the batteries in the rebuilt battery pack from running down in an early stage and to prevent a drawback such that the rebuilt battery pack cannot be used in the early stage.

Furthermore, the batteries of the A period having a long residual lifetime are collected. Therefore, it is possible to use the rebuilt battery pack for a long period of time.

(7) Furthermore, preferably, in a rebuilt battery pack reconstituted by collecting a plurality of used secondary batteries having been already used, the batteries has characteristics such that in an initial stage of a usable period, a battery resistance is gradually reduced and an initial-stage high-resistance period having a relatively high battery resistance appears, in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein the used secondary batteries belong to one layer or some adjacent layers of the plurality of layers classified in the resistance classifying step in the configuration (3).

The rebuilt battery pack uses a battery such as the one distinguished to be in the middle-stage low-resistance period (the B period) through the sorting, and a battery belonging to one layer or some adjacent layers of the plurality of layers obtained by a classification through the battery resistance. Therefore, the batteries used in the battery pack have a smaller variation in the characteristics and it is possible to prevent a drawback such as overvoltage or overcharge applied to some of the batteries, which is caused by the variation in the characteristic between the batteries. In addition, the battery of the B period is used. Therefore, even if the battery is used, the characteristics of the respective batteries are less changed so that the rebuilt battery pack having stable characteristics can be obtained.

Moreover, the battery of the C period is not mixed. Therefore, it is possible to prevent some of the batteries in the rebuilt battery pack from running down in an early stage and to prevent a drawback such that the rebuilt battery pack cannot be used in the early stage.

(8) Alternatively, preferably, in a rebuilt battery pack reconstituted by collecting a plurality of used secondary batteries having been already used, the batteries has characteristics such that in an initial stage of a usable period, a battery resistance is gradually reduced and an initial-stage high-resistance period having a relatively high battery resistance appears, in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein the used secondary batteries belong to one layer or some adjacent layers of the plurality of layers classified in the discharging-time classifying step described in the configuration (4).

The rebuilt battery pack uses a battery such as the one distinguished to be in the middle-stage low-resistance period (the B period) through the sorting, the one classified through the battery resistance, or the one belonging to one layer or some adjacent layers of the plurality of layers obtained by a further classification through the discharging time. Therefore, the batteries used in the battery pack also have uniform characteristics which cannot be detected by the battery resistance (by the DC-IR method or the AC-IR method) and it is possible to prevent a drawback such as overvoltage or overcharge applied to some of the batteries, which is caused by the variation in the characteristics between the batteries. In particular, it is possible to obtain a rebuilt battery pack in which a difference in the characteristics unlikely to appear and the characteristics is uniform in the middle temperature region having a relatively low temperature. In addition, the battery of the B period is used. Therefore, even if the battery is used, the characteristics of the respective batteries are less changed so that the rebuilt battery pack having stable characteristics can be obtained.

Moreover, the battery of the C period is not mixed. Therefore, it is possible to prevent some of the batteries in the rebuilt battery pack from running down in an early stage and to prevent a drawback such that the rebuilt battery pack cannot be used in the early stage.

(9) Alternatively, another aspect to solve the problems provides a rebuilt battery pack reconstituted by collecting a plurality of used secondary batteries having been already used, the batteries having characteristics such that in an initial stage of a usable period, a battery resistance is gradually reduced and an initial-stage high-resistance period having a relatively high battery resistance appears, in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein each of the used secondary batteries belongs to the middle-stage low-resistance period.

The rebuilt battery pack is obtained by collecting the used secondary battery belonging to the middle-stage low-resistance period (the B period). Therefore, the batteries used in the battery pack have a small variation in the characteristics and it is possible to prevent a drawback such as overvoltage or overcharge applied to some of the batteries, which is caused by the variation in the characteristics between the batteries. In addition, the battery of the B period is used. Even if the battery is used, therefore, the characteristics of the respective batteries are less changed so that the rebuilt battery pack having a stable characteristics can be obtained.

To the contrary, the battery of the C period is not mixed. Therefore, it is possible to prevent some of the batteries in the rebuilt battery pack from running down in an early stage and to prevent a drawback such that the rebuilt battery pack cannot be used in the early stage.

(10) Moreover, another aspect to solve the above problems provides a vehicle on which any one of the aforementioned rebuilt battery packs is mounted, the vehicle using electric energy of the rebuilt battery pack for a whole or partial power source.

The vehicle is provided with the rebuilt battery pack described above. As compared with the case in which a brand-new battery is used, therefore, the vehicle can be more inexpensive, and furthermore, can effectively utilize the used battery.

Examples of the vehicle include an electric car, a plug-in hybrid car, a hybrid car, a hybrid railway vehicle, an electric forklift truck, an electric wheelchair, an electric bicycle, an electric motor scooter and the like.

(11) In addition, another aspect to solve the above problems provides a battery operated device on which any one of the aforementioned rebuilt battery packs is mounted, the battery operated device using the rebuilt battery pack as at least one of energy sources.

The battery operated device is provided with the rebuilt battery pack described above. As compared with the case in which a brand-new battery is used, therefore, the device can be more inexpensive, and furthermore, can effectively utilize the used battery.

The battery operated device includes various household electric appliances, office devices, industrial devices and the like which are driven by a battery, for example, a personal computer, a portable telephone, a battery driven electric tool, an uninterruptible power supply and the like.

(12) Moreover, another aspect to solve the above problems provides a method of manufacturing a rebuilt battery pack reconstituted by collecting a plurality of used secondary batteries having been already used, the batteries having characteristics such that in an initial stage of a usable period, a battery resistance is gradually reduced and an initial-stage high-resistance period having a relatively high battery resistance appears, in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein the method includes: a resistance distinguishing step of distinguishing whether the battery resistance of the used secondary battery is high or low as compared with a period threshold identifying whether the used secondary battery is present in one of the initial-stage high-resistance period or ending-stage high-resistance period and the middle-stage low-resistance period; and a first type reconstituting step of collecting the used secondary batteries having the lower battery resistance than the period threshold to reconstitute the battery pack.

According to the method for manufacturing a rebuilt battery pack, the used secondary battery belonging to the middle-stage low-resistance period (the B period) be collected to reconstitute the rebuilt battery pack at the first type reconstituting step.

Therefore, it is possible to manufacture the following rebuilt battery pack. More specifically, the batteries used in the rebuilt battery pack have a small variation in the characteristics and it is possible to prevent a drawback such as overvoltage or overcharge applied to some of the batteries, which is caused by the variation in the characteristics between the batteries in the battery pack.

Moreover, the battery of the B period is used. Even if the battery is used, therefore, the characteristics of the respective batteries are less changed so that a stable characteristics can be obtained. Therefore, it is possible to manufacture a rebuilt battery pack having a stable characteristics in which batteries have similar characteristics to each other and a battery resistance is unlikely to be changed.

Moreover, the battery of the C period is not mixed. Therefore, it is possible to prevent some of the batteries in the rebuilt battery pack from running down in an early stage and to prevent a drawback such that the rebuilt battery pack cannot be used in the early stage.

(13) Furthermore, preferably, the aforementioned method of manufacturing a rebuilt battery pack further includes: a resistance classifying step of classifying the used secondary batteries having a lower battery resistance than the period threshold into a plurality of layers based on a magnitude of the battery resistance; and a second type reconstituting step, in place of the first type reconstituting step, of collecting the used secondary batteries belonging to one layer or some adjacent layers of the plurality of layers classified by the battery resistance to reconstitute a battery pack.

According to the method for manufacturing a rebuilt battery pack, the used secondary battery having the lower battery resistance than the period threshold, that is, the used secondary battery belonging to the middle-stage low-resistance period (the B period) is further classified into the plurality of layers depending on the magnitude of the battery resistance in the resistance classifying step. The batteries belonging to one layer or some adjacent layers of the plurality of layers further classified are collected to manufacture the rebuilt battery pack. Therefore, the batteries used in the battery pack have a smaller variation in the characteristics and it is particularly possible to prevent a drawback such as overvoltage or overcharge applied to some of the batteries, which is caused by the variation in the characteristics between the batteries. In addition, the battery of the B period is used. Even if the battery is used, therefore, the characteristics of the respective batteries are less changed. Thus, it is possible to manufacture the rebuilt battery pack having a stable characteristic.

(14) Furthermore, in one of the aforementioned method of manufacturing the rebuilt battery pack, preferably, the used secondary battery has characteristics such that in a usable temperature range of the battery, a DC resistance of the battery is increased as a temperature of the battery is lowered, and a change in the DC resistance due to the temperature is small in a high temperature region having a relatively high temperature, and a change in the DC resistance due to the temperature is large in a low temperature region having a relatively high temperature, and the DC resistance in the low temperature region is equal to or more than three times as high as the DC resistance in the high temperature region, and the DC resistance is acceleratively increased as the temperature of the battery is lowered in a middle temperature region between the high temperature region and the low temperature region, the method includes: a discharging-time classifying step of further classifying, in an environment of the middle temperature region, the used secondary batteries having the smaller battery resistance than the period threshold or classified in the resistance classifying step, into a plurality of layers based on a length of a discharging time of constant power discharging or constant current discharging which is started at a predetermined discharging start voltage within a highest voltage range defined as an uppermost ⅕ of an allowable voltage range ranging from a minimum allowable voltage to a maximum allowable voltage, and ended at a predetermined discharging end voltage within a lowest voltage range defined as a lowermost ⅕ of the allowable voltage range; and a third type reconstituting step, provided in place of the first type reconstituting step or the second type reconstituting step, of reconstituting the battery pack by collecting the used secondary batteries belonging to one layer or some adjacent layers of the plurality of layers classified based on the length of the discharging time.

According to this method for manufacturing a rebuilt battery pack, in the discharging-time classifying step, the used secondary battery of the B period or the used secondary battery classified by the battery resistance is further classified into the plurality of layers based on the discharging time to manufacture the rebuilt battery pack by collecting the batteries belonging to one layer or some adjacent layers of the plurality of layers. Therefore, it is possible to manufacture the rebuilt battery pack by properly classifying a difference in the battery characteristics in an environment of a middle temperature region, which cannot be found by the battery resistance (by the DC-IR method or the AC-IR method) and collecting the used secondary batteries having more similar characteristics to each other. In particular, it is possible to utilize the batteries having the similar characteristics in the middle temperature region environment having a relatively low temperature. Therefore, in the actual use of the rebuilt battery pack in the middle temperature region environment, the difference in the characteristics between the batteries is unlikely to appear and it is possible to manufacture a battery pack which can be used stably.

In particular, the method for manufacturing a rebuilt battery pack described above includes a discharging-time classifying step and a third type reconstituting step. The discharging-time classifying step classifies, in an environment of 10° C. to −20° C., the used secondary battery having the lower battery resistance than the period threshold or classified in the resistance classifying step into a plurality of layers based on a length of a discharging time of constant power discharging or the constant current discharging which is started with a current of 10 C or less in the full charging state, and ended at a minimum allowable voltage. The third type reconstituting step, in place of the first type reconstituting step or the second type reconstituting step, collects the used secondary batteries belonging to one layer or some adjacent layers of the plurality of layers classified based on the discharging time to reconstitute a battery pack.

In addition, this manufacturing method has a wide range of voltage to be changed through discharge. Therefore, a difference in the discharging time caused by a difference in the characteristics of the battery appears greatly so that the respective batteries can be classified more properly.

It is also possible to employ the following sorting method without sorting a battery by comparing a battery resistance of a used secondary battery with a period threshold. In other words, according to the method for sorting a used secondary battery, the used secondary battery has characteristics such that the DC resistance of the battery is increased when the temperature of the battery is lowered within a usable temperature range of the battery, change in the DC resistance due to the temperature is small in a high temperature region having a relatively high temperature, change in the DC resistance due to the temperature is great in the low temperature region having a relatively high temperature, and the DC resistance in the low temperature region is equal to or more than three times as high as the DC resistance in the high temperature region, and the DC resistance is acceleratively increased when the temperature of the battery is lowered in a middle temperature region between the high temperature region and the low temperature region. In addition, the method for sorting a used secondary battery include a discharging-time classifying step further classifying, in an environment of the middle temperature region, the used secondary battery into a plurality of layers based on a length of a discharging time of constant power discharging or constant current discharging which is started at a predetermined discharging start voltage within a highest voltage range, that is, the uppermost ⅕ of an allowable voltage range, and ended at a predetermined discharging end voltage within a lowest voltage range, that is, the lowermost ⅕ of the allowable voltage range, the allowable voltage range being between a minimum allowable voltage and a maximum allowable voltage.

According to the method for sorting a used secondary battery, the used secondary battery is classified into a plurality of layers based on the discharging time required for carrying out a constant power discharge or a constant current discharge in the middle temperature region environment. Therefore, it is possible to properly detect a difference in battery characteristics in a middle temperature region environment having a relatively low temperature, the characteristics cannot be found by the battery resistance (by the DC-IR method or the AC-IR method) at an ordinary temperature, thereby classifying the respective batteries into a plurality of layers. Thus, the used secondary batteries having similar characteristics can be collected precisely. In the use of the battery in the middle temperature region environment in which the DC resistance of the battery is slightly raised at a relatively low temperature, particularly, it is possible to sort the used secondary batteries having similar characteristics. In the actual use of the battery in the middle temperature region environment, therefore, the difference in the characteristics between the batteries is unlikely to appear and it is possible to easily constitute a battery assembly having a stable characteristics (a small battery pack), a battery unit assembled from those battery assemblies (a large battery pack) and the like.

In particular, the method for sorting a used secondary battery include a discharging-time classifying step of classifying, in an environment of 10° C. to −20° C., the used secondary battery into a plurality of layers based on a length of a discharging time of constant power discharging or constant current discharging which is started with a current of 10 C or less in the full charging state and ended at the minimum allowable voltage.

According to the method for sorting a used secondary battery, in an environment having a relatively low temperature, the used secondary battery are classified into a plurality of layers based on the length of the discharging time of constant power discharging or constant current discharging which is started in the full charging state and ended at the allowable minimum voltage. Therefore, it is possible to properly detect a difference in battery characteristics in the environment having the relatively low temperature, the characteristics cannot be found by the battery resistance (by the DC-IR method or the AC-IR method) at an ordinary temperature, thereby classifying the respective batteries. Thus, the used secondary batteries having similar characteristics can be collected precisely. In the use of the battery in the environment having the relatively low temperature, particularly, it is possible to classify the used secondary batteries having similar characteristics. In the actual use of the battery in the environment, therefore, the difference in the characteristics is unlikely to appear and it is possible to easily constitute a battery pack having a stable characteristic, a battery unit assembled from those battery packs (a large battery pack) and the like.

In addition, the sorting method has a wide range of voltage to be changed through discharge. Therefore, a difference in the discharging time caused by a difference in the characteristics of the battery appears greatly so that the respective batteries can be classified more properly.

The rebuilt battery pack reconstituted by collecting the plurality of used secondary batteries may be a rebuilt battery pack in which the used secondary batteries belong to one layer or some adjacent layers of the plurality of layers classified in the discharging-time classifying step in the method for sorting a used secondary battery described in the immediately above two paragraphs.

The rebuilt battery pack utilizes a used secondary battery having uniform characteristics in an environment of a middle temperature region having a relatively low temperature through sorting. Therefore, the batteries used in the battery pack also have uniform characteristics which cannot be detected by the battery resistance (by the DC-IR method or the AC-IR method) and it is possible to prevent a drawback such as overvoltage or overcharge applied to some of the batteries, the drawback is caused by the variation in the characteristics between the batteries. In particular, it is possible to obtain a battery pack in which a difference in the characteristics is unlikely to appear in the middle temperature region having a relatively low temperature and which can be used stably.

Furthermore, in the method for manufacturing a rebuilt battery pack reconstituted by collecting the used secondary batteries, preferably, the used secondary battery has characteristics such that the DC resistance of the battery is increased when the temperature of the battery is lowered within a usable temperature range of the battery, change in the DC resistance due to the temperature is small in a high temperature region having a relatively high temperature, change in the DC resistance due to the temperature is large in a low temperature region having a relatively low temperature, and the DC resistance in the low temperature region is equal to or more than three times as high as the DC resistance in the high temperature region, and the DC resistance is acceleratively increased when the temperature of the battery is lowered in a middle temperature region between the high temperature region and the low temperature region. In addition, this method includes a discharging-time classifying step and a fourth type reconstituting step. The discharging-time classifying step further classifies, in an environment of the middle temperature region, the secondary batteries into a plurality of layers based on a length of a discharging time of constant power discharging or constant current discharging which is started at a predetermined discharging start voltage within a highest voltage range, that is, the uppermost ⅕ of the allowable voltage range, and ended at a predetermined discharging end voltage within a lowest voltage range, that is, the lowermost ⅕ of the allowable voltage range, the allowable voltage range being between a minimum allowable voltage and a maximum allowable voltage. The fourth type reconstituting step reconstitutes a battery pack by collecting used secondary batteries belonging to one layer or some adjacent layers of the plurality of layers classified by the discharging time.

According to this method for manufacturing a rebuilt battery pack, in the discharging-time classifying step, the used secondary battery is classified into the plurality of layers based on the length of the discharging time to collect the batteries belonging to one layer or some adjacent layers of the plurality of layers to manufacture the rebuilt battery pack. Therefore, it is possible to manufacture the rebuilt battery pack by properly classifying a difference in the battery characteristics in the middle temperature region environment, the characteristics cannot be found by the battery resistance (by the DC-IR method or the AC-IR method), and collecting the used secondary batteries having similar characteristics to each other. In particular, it is possible to utilize the batteries having the similar characteristics in the middle temperature region environment having a relatively low temperature. In the actual use of the rebuilt battery pack in the middle temperature region environment, therefore, the difference in the characteristics between the batteries is unlikely to appear and it is possible to manufacture a battery pack which can be utilized stably.

In particular, preferably, the method for manufacturing a rebuilt battery pack reconstituted by collecting the used secondary batteries include a low temperature discharging-time classifying step and a fourth type reconstituting step.

The low temperature discharging-time classifying step classifies, in an environment of 10° C. to −20° C., the used secondary battery into a plurality of layers based on a length of a discharging time of constant power discharging or constant current discharging which is started with a current of 10 C or less in a full charging state, and ended at a minimum allowable voltage. The fourth type reconstituting step collects the used secondary batteries belonging to one of the plurality of layers classified based on the discharging time to reconstitute a battery pack.

According to this method for sorting a used secondary battery, the used secondary battery is classified, in the environment having the relatively low temperature, into a plurality of layers based on the length of the discharging time of constant power discharging or constant current discharging which is started in the full charging state, and ended at the minimum allowable voltage. Therefore, it is possible to properly detect a difference in battery characteristics in the environment having the relatively low temperature, the characteristics cannot be found by the battery resistance (by the DC-IR method or the AC-IR method) at an ordinary temperature, thereby classifying the respective batteries. Thus, the used secondary batteries having similar characteristics can be collected precisely. In the use of the battery in the environment having the relatively low temperature, particularly, it is possible to sort the used secondary batteries having similar characteristics. In the actual use of the battery in the environment, therefore, the difference in the characteristics is unlikely to appear and it is possible to easily constitute a battery pack having a stable characteristic, a battery unit assembled from those battery packs (a large battery pack) and the like.

In addition, the sorting method has a wide range of voltage to be changed through discharge. Therefore, a difference in the discharging time caused by a difference in the characteristics of the battery appears greatly so that the respective batteries can be classified more properly.

MODE FOR CARRYING OUT THE INVENTION

First Embodiment

Figure 1:
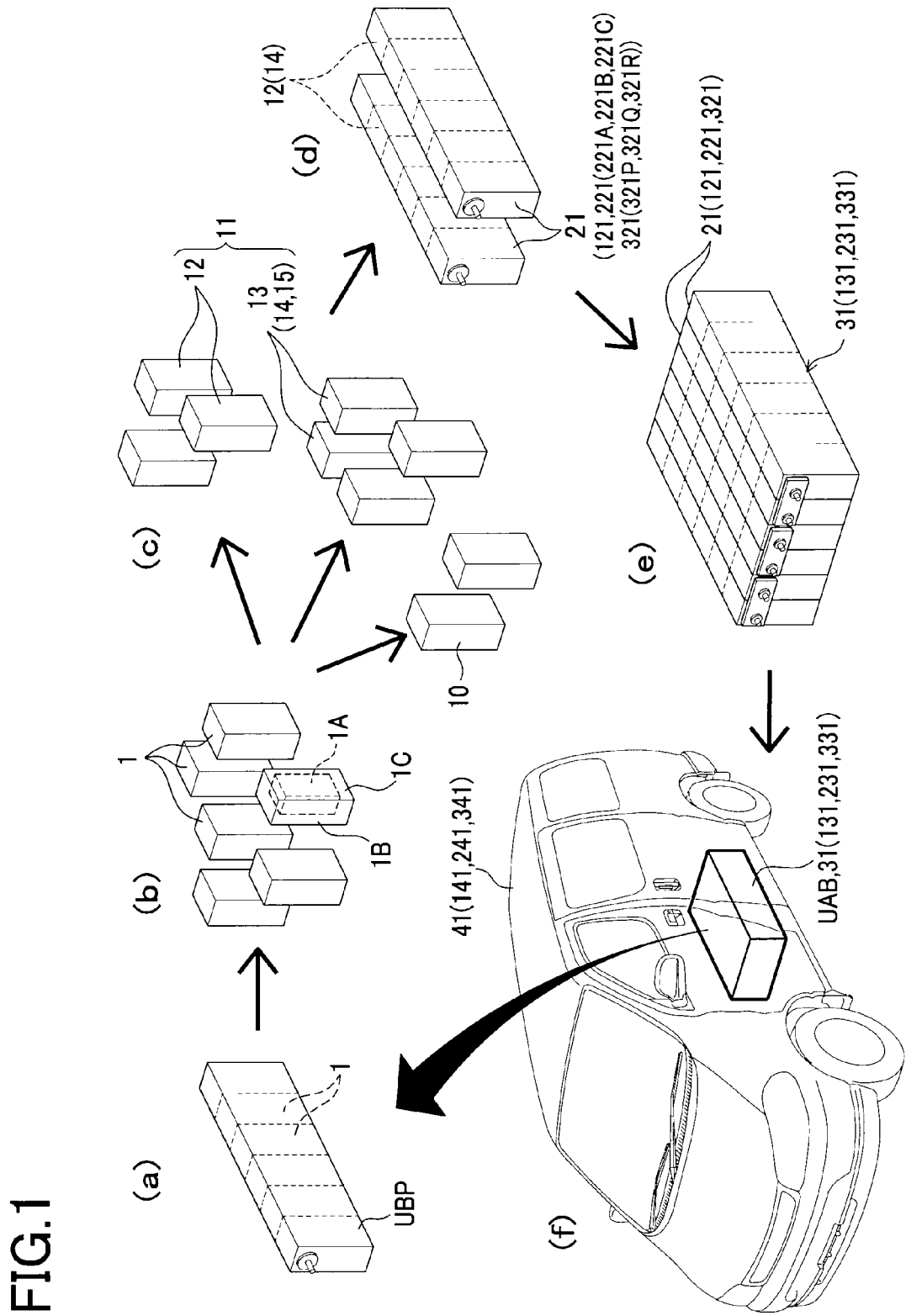
FIG. 1 is an explanatory view showing a process while used secondary batteries are obtained from a used secondary battery assembly and then a rebuilt battery unit is mounted on a vehicle.

A first embodiment according to the present invention will be described with reference to FIGS. 1 to 4. An on-vehicle secondary battery is mounted on a vehicle 41 and utilized as a battery unit (a used battery unit) UAB as shown in FIG. 1 (f). In the case in which the vehicle 41 is scrapped, the case in which the used battery unit UAB is exchanged into a new battery unit or the case in which some of used battery assemblies UBP constituting the used battery unit UAB are exchanged, the used battery unit UAB or the used battery assembly(s) UBP is generated.

The used battery unit UAB is constituted by a plurality of used battery assemblies UBP. Moreover, the used battery assembly UBP is constituted by a plurality of (six in FIG. 1) used secondary batteries 1 as shown in FIG. 1(a). Though the used battery unit UAB or the used battery assembly UBP can be recycled as it is in some cases, they are not suitable for recycling due to a reason such that some of the batteries 1 forming the used battery assembly UBP are deteriorated in other cases. As shown in FIG. 1(b), therefore, the used battery assembly UBP is broken down and divided into individual batteries 1, and they are screened into a battery(s) 11 which can be recycled and a battery(s) 10 which cannot be recycled due to deterioration, a defect or the like. In the present embodiment, furthermore, the reusable battery(s) 11 is sorted (classified) into a battery(s) 12 having an almost half of the service life left (a battery of a period B to be described later) and the other batteries 13 (batteries of periods A and C to be described later) (see FIG. 1(c)).

As shown in FIG. 1(d), furthermore, the batteries 11 are classified into two layers or classes, i.e., the batteries 12 and the batteries 13. The batteries 12 belonging to the period B that is one of two layers in the batteries 11 are collected to reconstitute a rebuilt battery assembly 21. As shown in FIG. 1(e), moreover, the rebuilt battery assemblies 21 are collected to reconstitute a rebuilt battery unit 31, and the rebuilt battery unit 31 is mounted on the vehicle 41.

First of all, the battery 1 in the first embodiment will be described. The battery 1 is a known Ni-hydrogen secondary battery (an Ni-MH secondary battery) which accommodates a power generating element 1A of a lamination type in a metal battery case 1B. The power generating element 1A includes a positive electrode plate and a negative electrode plate, and a separator provided therebetween which are not shown, and is impregnated with an electrolyte 1C which mainly contains potassium oxide.

Figure 2:
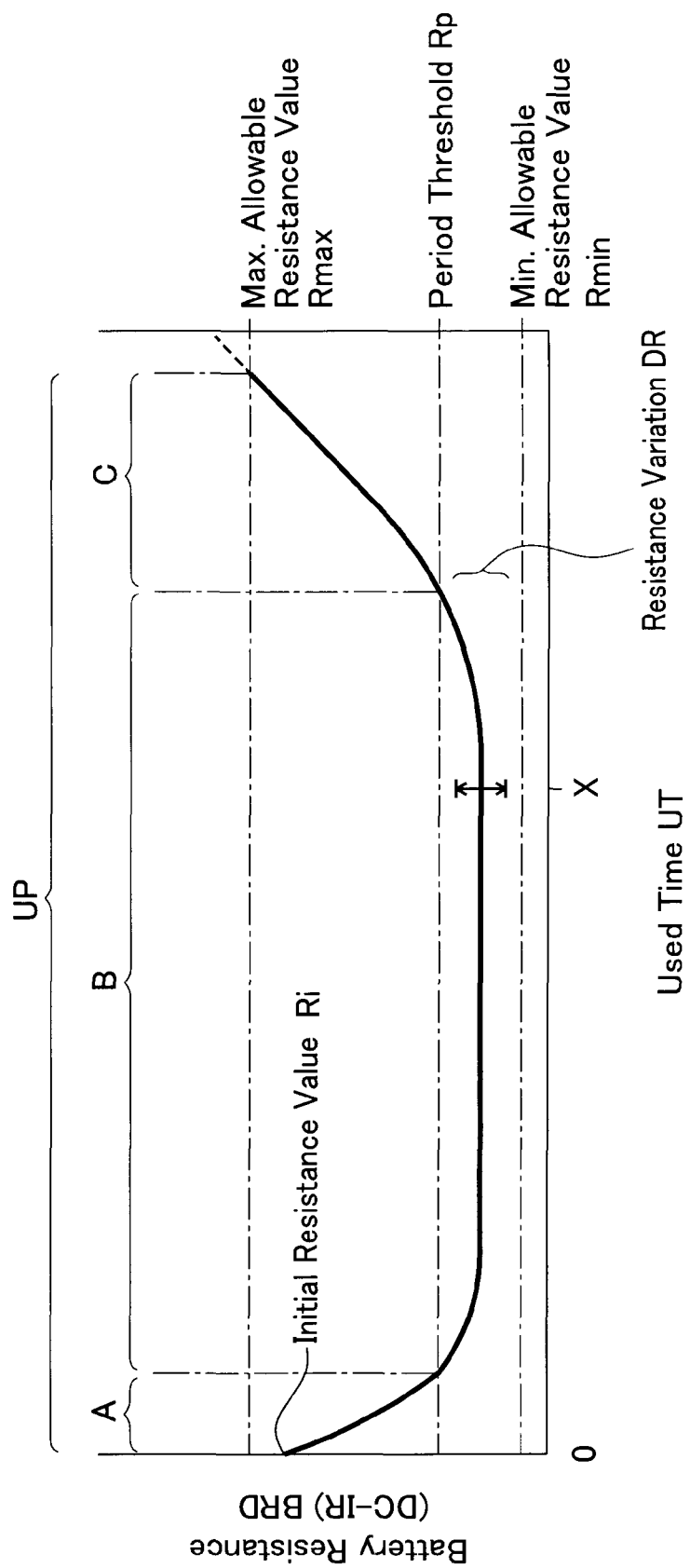
FIG. 2 is a graph showing changes in battery resistance (DC-IR method) to elapsed time of a using period.

The on-vehicle battery 1 has a property such that a characteristics thereof is changed as time for using the battery has been passed, and exhibits changes in a so-called bathtub-shaped characteristics change (resistance change) as schematically shown in FIG. 2. In other words, through an observation of change in a DC resistance (a battery resistance) BRD of the battery measured by the DC-IR method which serves as an index of the characteristics of the battery with respect to the used time of the battery 1, it is found that the battery has a property changed as shown in FIG. 2. More specifically, although a battery resistance (an initial resistance value Ri) is lower than a later-described maximum allowable resistance value Rmax around the time of starting to use (a used time of 0), it has a relatively high value. When the battery 1 is started to be used, however, the battery resistance BRD is gradually decreased. This period is varied depending on the use condition of the battery 1, and takes an approximately half year to two years. When the battery is used to some degree, there is reached a period for which the battery resistance BRD is almost constant and is not varied even if the time of use passes. This period continues for approximately 5 to 10 years. When the battery 1 is used after the period is expired, furthermore, the battery resistance BRD is gently raised together with the time of use and finally exceeds the maximum allowable resistance value Rmax to reach an application limit (unusable). This period continues for approximately 1 to 2 years.

Each battery 1 has a variation in the characteristic. Accordingly, a variation DR in the battery resistance BRD on a point of a used time X is represented as a range of a double arrow in FIG. 2, for example.

Moreover, the battery resistance (the DC-IR method) BRD is measured in the following manner.

A current value I is varied in order of I=2 C, 4 C, 10 C and 20 C to charge or discharge by performing the charge of the current value I for a period of T seconds and a stop, and the discharge of the current value I for a period of T seconds and the stop. For the period of T seconds, a value selected from 2 to 10 seconds, for example, T=2 seconds is set. A relationship between a magnitude of each current value I in the charge or discharge and a battery voltage BV in that case is measured to plot them with a horizontal axis indicates a current value and a vertical axis indicates a voltage. Furthermore, a regression line is drawn by the least squares method to obtain a gradient of the graph (straight line). The gradient is equivalent to the DC resistance (battery resistance) BRD of the battery in accordance with the Ohm's law.

By utilizing the above characteristic, the battery 1 is sorted. A procedure for sorting the battery and manufacturing a rebuilt battery assembly and a rebuilt battery unit according to the present embodiment will be described with reference to FIGS. 3 and 2.

Figure 3:
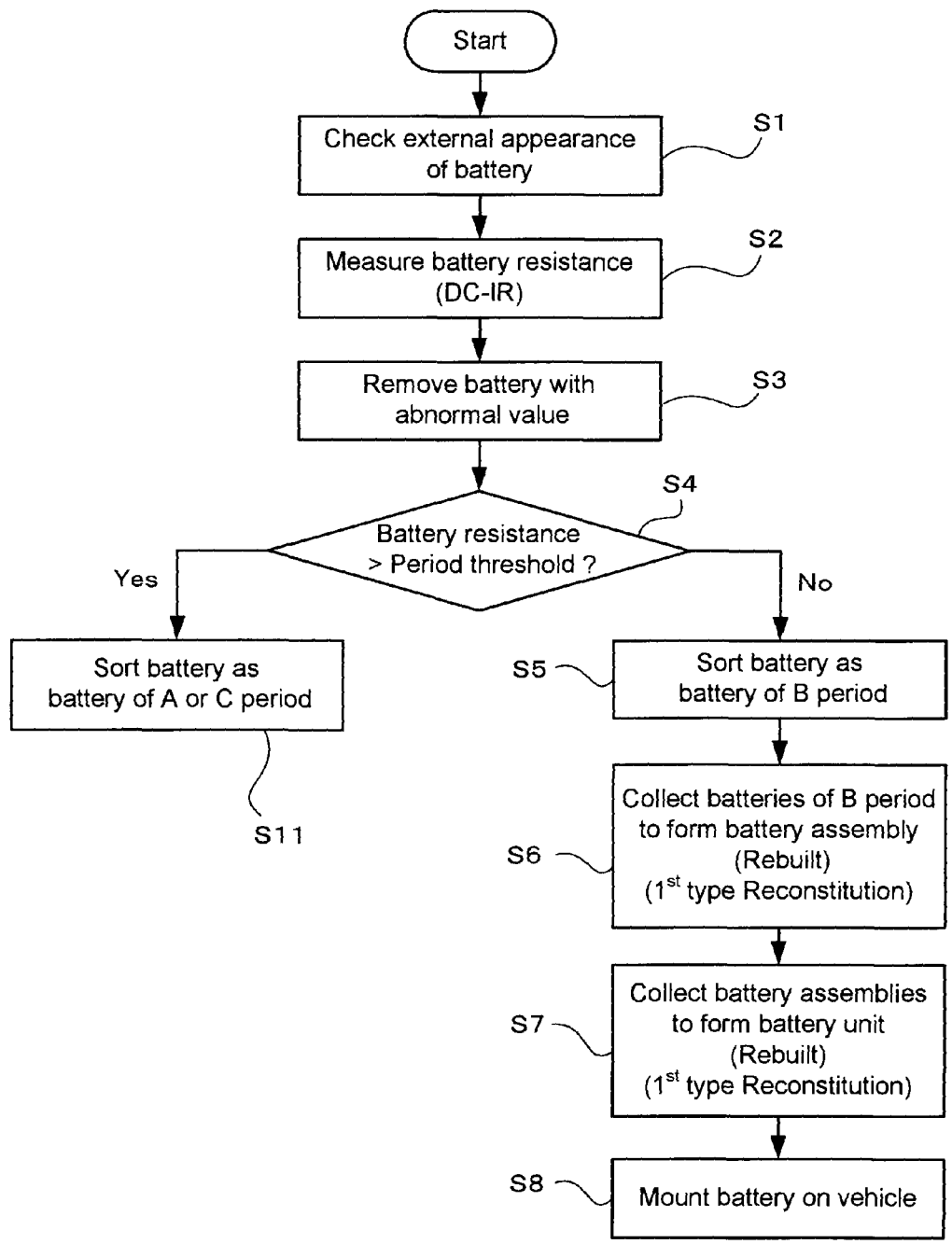
FIG. 3 is a flowchart showing a flow to classify a battery and manufacture a battery assembly and a battery unit in a first embodiment.

First of all, in Step S1 of FIG. 3, an external appearance of the battery 1 is checked and the battery 10 having a defect (a deformation of a vessel such as a bulge or a dent, a flaw, a corrosion or the like) is removed. For each of the remained batteries 1, furthermore, the battery resistance BRD is measured by the technique described above (Step S2). In Step S3, subsequently, the battery 10 having a short circuit, an open circuit or the other abnormal value, more specifically, the battery 10 having the battery resistance BRD lower than a minimum allowable resistance value Rmin or exceeding the maximum allowable resistance value Rmax is also removed.

In Step S4, moreover, the measured battery resistance BRD is compared with a period threshold Rp. In consideration of the variation in the characteristics of the battery 1, the period threshold Rp is smaller than a minimum value of an initial resistance value Ri which can be taken by the battery 1 at the beginning of use and is equal to or greater than a maximum value (a maximum value of the battery resistance BRD considering the resistance variation DR in the used time X) of the battery resistance BRD which can be taken by the battery of a period in which a used time UT has been passed and the battery resistance BRD is almost constant as shown in FIG. 2.

As shown in FIG. 2, by the comparison with the period threshold Rp, a period in which the battery resistance BRD is lower than the period threshold Rp is set to be a middle-stage low-resistance value period B (a B period) in a middle stage of a usable period UP until the battery runs down. Furthermore, a period in which the used time UT is short and the battery resistance BRD is higher than the period threshold Rp in an initial stage of the usable period UP is set to be an initial-stage high-resistance value period A (an A period). Moreover, a period in which the used time is long and the battery resistance BRD is higher than the period threshold Rp in an ending stage of the usable period UP is set to be an ending-stage high-resistance value period C (a C period).

In Step S4, the battery 1 is sorted (classified) whether it is the battery 12 of the B period or the battery 13 of the other periods (the A and C periods) by the comparison between the battery resistance BRD and the period threshold Rp. In other words, if the battery resistance BRD is higher than the period threshold Rp (Yes), the processing proceeds to Step S11 in which the battery 11 is distinguished to be the battery 13 of the A or C period.

On the other hand, if the battery resistance BRD is lower than the period threshold Rp (No), the processing proceeds to Step S5 in which the battery 11 is distinguished or classified to be the battery 12 of the B period. By using the period threshold Rp, thus, it is possible to easily and properly sort the used secondary battery 1 (11) into the battery 13 of the initial-stage high-resistance period (the A period) or the ending-stage high-resistance period (the C period) and the battery 12 of the middle-stage low-resistance period (the B period).

In Step S6, furthermore, the batteries 12 classified in the B period are collected to form (reconstitute) the rebuilt battery assembly 21 (see FIGS. 1(c) and 1(d)). Thus, the rebuilt battery assembly 21 can be manufactured.

Consequently, the rebuilt battery assembly 21 is reconstituted by the collection of the batteries 12 of the same B period. Therefore, the battery resistance BRD of each battery 12 is low and the whole rebuilt battery assembly 21 can also be a battery assembly having a low battery resistance.

Furthermore, the used batteries 12 have a small variation in the characteristics and it is possible to prevent a drawback such as overvoltage or overcharge applied to some of the batteries, which is caused by the resistance variation DR between the used batteries 12. In addition, the battery 12 of the B period is used. Even if the battery 12 is used, therefore, the characteristics of the respective batteries 12 are less changed so that they can be formed into the rebuilt battery assembly 21 having a stable characteristic.

To the contrary, the battery 13 of the C period is not mixed. Therefore, it is possible to prevent some of the batteries in the rebuilt battery assembly 21 from running down in an early stage and to prevent a drawback such that the whole rebuilt battery assembly 21 cannot be used in the early stage.

The rebuilt battery assembly 21 is a kind of rebuilt battery packs (small rebuilt battery packs).

Furthermore, the processing proceeds to Step S7 in which the rebuilt battery assemblies 21 utilizing the batteries 12 are collected to form (reconstitute) the rebuilt battery unit 31 (see FIG. 1(e)). Thus, the rebuilt battery unit 31 can be manufactured. The rebuilt battery unit 31 is a kind of rebuilt battery packs (large rebuilt battery packs).

Also in this case, the batteries 12 used for the battery unit 31 have a small variation in the characteristics, and it is possible to prevent a drawback such as overvoltage or overcharge applied to some of the batteries (or the rebuilt battery assembly 21), which is caused by the resistance variation DR between the batteries. In addition, the battery 12 of the B period is used. Even if the battery 12 is used, therefore, the characteristics of the respective batteries 12 are less changed so that they can be formed into the rebuilt battery unit 31 having a stable characteristic.

Figure 4:
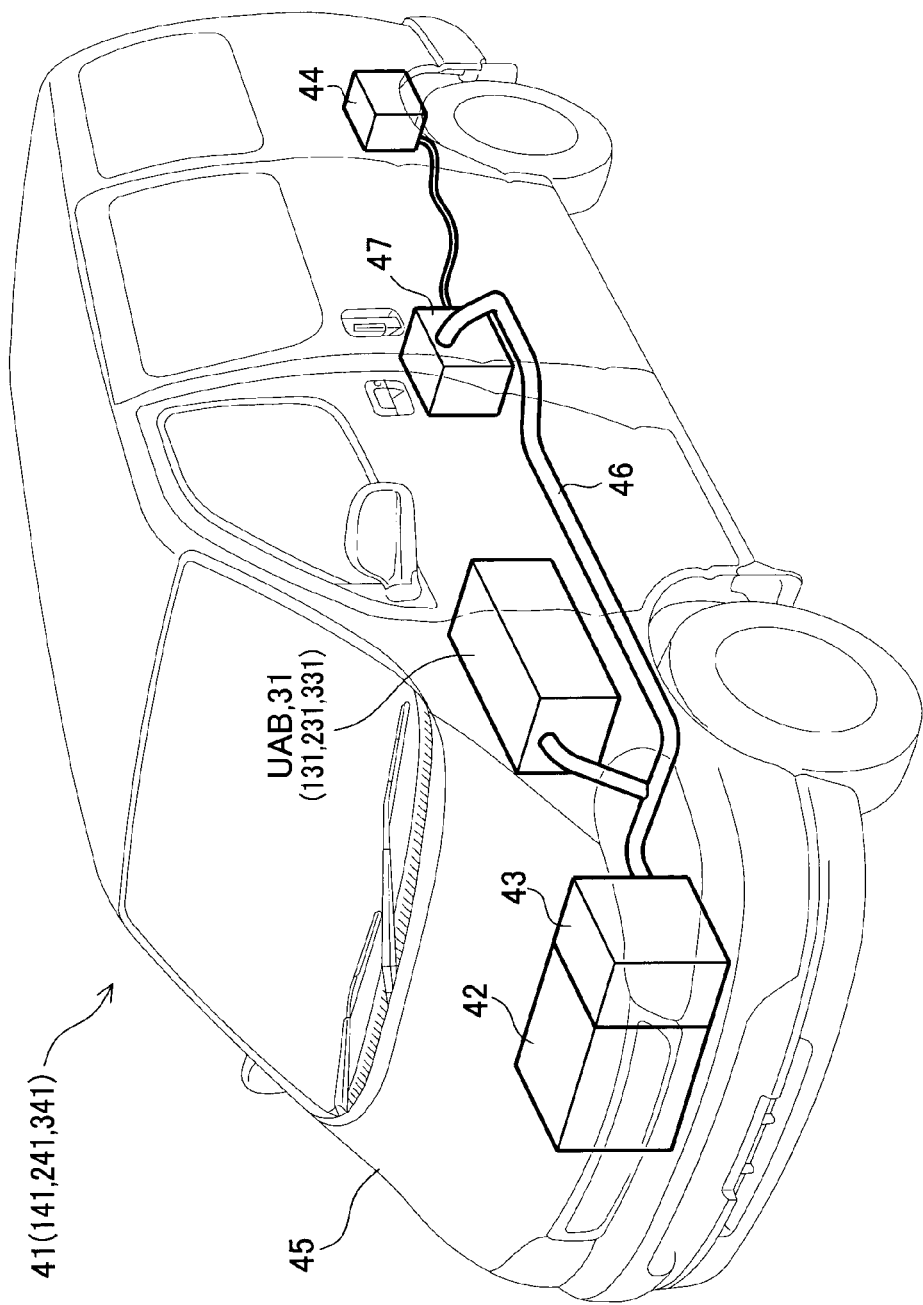
FIG. 4 is an explanatory view showing a vehicle in which a rebuilt battery unit is mounted.

Furthermore, the processing proceeds to Step S8 in which the rebuilt battery unit 31 is incorporated into the vehicle 41 (see FIG. 1(f)). Thus, it is possible to manufacture the vehicle 41 provided with the rebuilt battery unit 31 (the rebuilt battery assemblies 21). The vehicle 41 is a hybrid car to be driven by utilizing an engine 42, a front motor 43 and a rear motor 44 together as shown in FIG. 4. The vehicle 41 includes a car body 45, the engine 42, the front motor 43 attached thereto, the rear motor 44, a cable 46 and an inverter 47. Furthermore, the vehicle 41 includes the rebuilt battery unit 31 and utilizes the electrical energy caused by the rebuilt battery unit 31 for driving the front motor 43 and the rear motor 44.

The vehicle 41 is provided with the rebuilt battery unit 31 (rebuilt battery pack). Therefore, the vehicle 41 can be more inexpensive as compared with the case in which a brand-new battery (battery unit) is used. In addition, it is possible to effectively utilize the used secondary battery 1.

In the first embodiment, Step S2 corresponds to a resistance measuring step, Step S4 corresponds to a resistance distinguishing step, and Steps S6 and S7 correspond to a first type reconstituting step.

Second Embodiment

Figure 5:
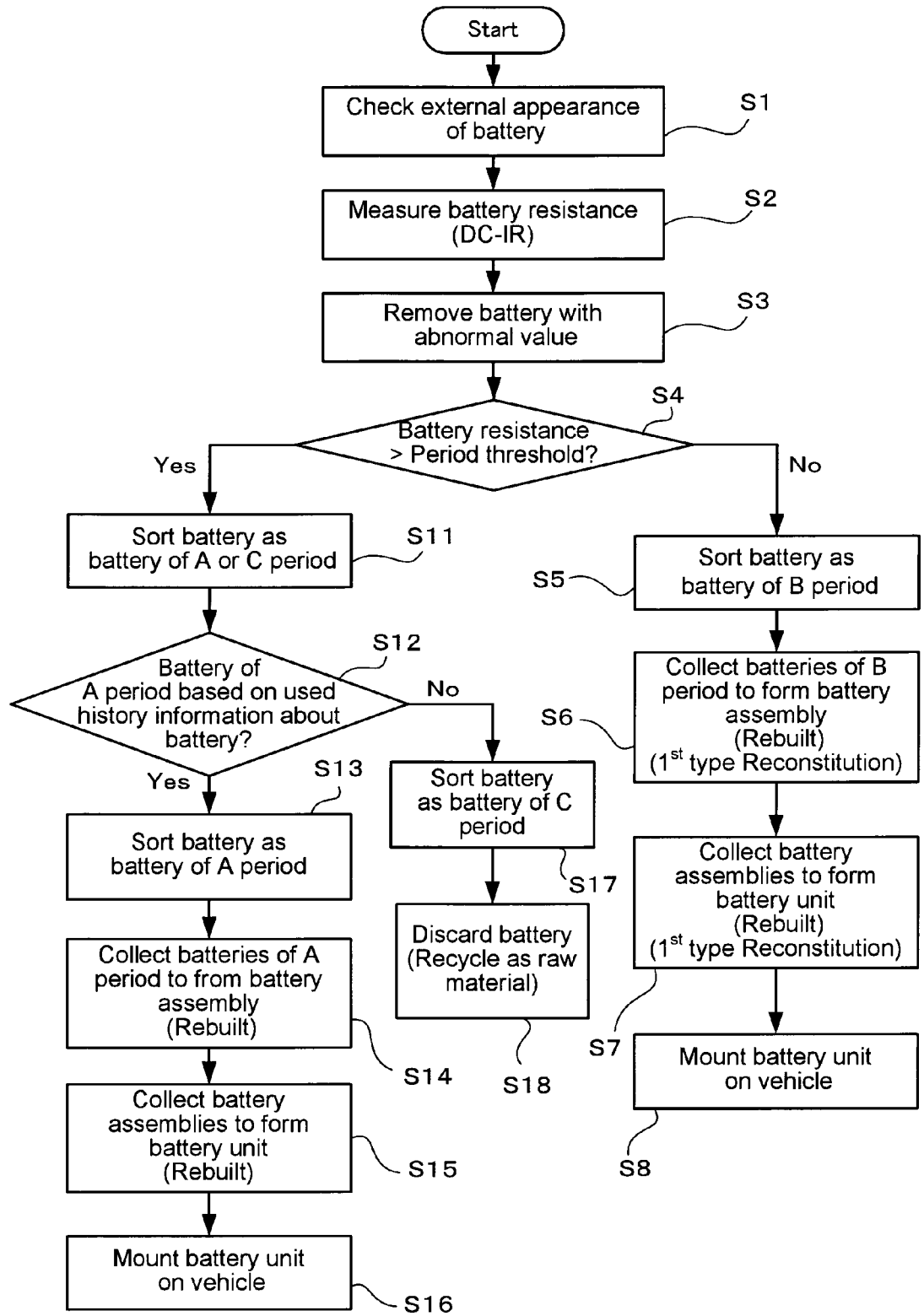
FIG. 5 is a flowchart showing a flow to classify a battery and manufacture a battery assembly and a battery unit in a second embodiment.

Next, a second embodiment will be described with reference to FIGS. 1, 2 and 5. In the first embodiment described above, according to the battery 12 of the B period, the rebuilt battery assembly 21 and the rebuilt battery unit 31 are manufactured in accordance with Steps S5 to S8, and furthermore, are mounted on the vehicle 41. On the other hand, if Yes in Step S4, that is, if the battery has the higher battery resistance BRD than the period threshold Rp, the processing proceeds to Step S11 in which the battery is sorted as the battery 13 of the A period or the C period and nothing is subsequently carried out.

On the other hand, in the second embodiment, according to the batteries 13 of the A and C periods, a rebuilt battery assembly 121 and a rebuilt battery unit 131 are manufactured and mounted on a vehicle 141 in accordance with Steps S11 to S18 differently from the first embodiment.

Therefore, portions different from the first embodiment will be mainly described below, while the explanation of the same portions as those in the first embodiment will be omitted or simplified.

Also in the second embodiment, the same battery 1 as that in the first embodiment is used for rebuilt. In other words, in the same manner as the first embodiment, an external appearance of the battery 1 is checked in Step S1 and a battery 10 having a defect is removed. Furthermore, a battery resistance BRD is measured (Step S2) and the battery 10 from which an abnormal value is detected is removed in Step S3.

In Step S4, subsequently, the measured battery resistance BRD is compared with a period threshold Rp. If the battery resistance BRD is smaller than the period threshold Rp (No), the processing proceeds to Step S5 in which the battery 11 is distinguished to be the battery 12 of a B period is made. Subsequently, a rebuilt battery assembly 21 and a rebuilt battery unit 31 are manufactured, and furthermore, are mounted on a vehicle 41 in the same manner as Steps S6 to S8 according to the first embodiment.

On the other hand, if the battery resistance BRD is higher than the period threshold Rp in Step S4 (Yes), the processing proceeds to Step S11 in which the battery 11 is distinguished to be the battery 13 of the A period or the C period.

Differently from the first embodiment, then, the processing proceeds to Step S12 in which it is distinguished or determined whether the battery 13 is a battery of the A period or not based on the used history information about the battery 13. For any battery 1 utilized in a battery unit UAB, production and used history thereof is managed. Accordingly, each of the batteries 1 (13) has the used history information such as operating time (an actual used time) of a battery after a start of the use. Therefore, the battery 13 is distinguished whether it is a battery of the A period or not by utilizing a used time UT in the used history information about the battery 13. More specifically, if the used time UT of the battery 13 is equal to or less than two years (Yes), the processing proceeds to Step S13 in which the battery 13 is sorted as a battery 14 of the A period. On the other hand, if the used time UT exceeds the two years (No), the processing proceeds to Step S17 in which the battery 13 is sorted as a battery 15 of the C period. Thus, the battery 13 is classified into two layers (the batteries 14 and 15).

The processing proceeds to Step S18 in which the battery 15 distinguished to be of the C period in Step S17 is discarded as the battery, and is decomposed and recycled as a raw material. It is anticipated that the battery 15 almost runs down and the battery resistance BRD is increased with the use. Even if the battery is used to rebuild a battery assembly or a battery unit, therefore, there is a high possibility that each battery might run down in an early stage, and recycling is hard to perform.

On the other hand, in Step S14, the batteries 14 classified as the A period are collected to form (reconstitute) the rebuilt battery assembly 121 (see FIG. 1(d)). In the second embodiment, thus, the rebuilt battery assembly 121 can be manufactured from the battery 14 of the A period.

In the rebuilt battery assembly 121, the battery 14 distinguished to be of the A period through the sorting is used. For this reason, the batteries 14 used in the battery assembly 121 have a small variation in the characteristics and it is possible to prevent a drawback such as overvoltage or overcharge applied to some of the batteries, which is caused by the resistance variation DR between the batteries. Thus, the rebuilt battery assembly 121 can be constituted.

Moreover, the battery 15 of the C period is not mixed. Therefore, it is possible to prevent some of the batteries in the rebuilt battery assembly 121 from running down in an early stage and to prevent a drawback such that the rebuilt battery assembly cannot be used in the early stage.

Furthermore, the batteries 14 of the A period having long remained lifetime are collected. Therefore, it is possible to use the rebuilt battery assembly for a long period of time.

In addition, the processing proceeds to Step S15 in which the rebuilt battery assemblies 121 using the batteries 14 are collected to form (reconstitute) the rebuilt battery unit 131 (see FIG. 1(e)). Thus, the rebuilt battery unit 131 can be manufactured. The rebuilt battery unit 131 is also a kind of a rebuilt battery pack.

Also in this case, the batteries 14 used in the battery unit 131 have a small variation in the characteristics, and it is possible to prevent a drawback such as overvoltage or overcharge applied to some of the batteries (or the rebuilt battery assembly 121), which is caused by the resistance variation DR between the batteries. In addition, the battery 14 of the A period is used. Even if the battery 14 is used, therefore, the characteristics of the respective batteries 14 are less changed so that they can be formed into the rebuilt battery unit 131 having a stable characteristic.

Furthermore, the processing proceeds to Step S16 in which the rebuilt battery unit 131 is incorporated into the vehicle 141 (see FIG. 1(f)). Thus, it is possible to manufacture the vehicle 141 provided with the rebuilt battery unit 131 (the rebuilt battery assembly 121). Since the vehicle 141 is the same as the vehicle 41 except for the battery unit 131, description will be omitted.

The vehicle 141 is provided with the rebuilt battery unit 131 (rebuilt battery pack). Therefore, the vehicle 141 can be more inexpensive as compared with the case in which a brand-new battery (battery unit) is used. In addition, it is possible to effectively utilize the used secondary battery 1.

Also in the second embodiment, Step S2 corresponds to a resistance measuring step, Step S4 corresponds to a resistance distinguishing step, Steps S6 and S7 correspond to a first type reconstituting step, and furthermore, Step S12 corresponds to a period distinguishing step.

Third Embodiment

Figure 6:
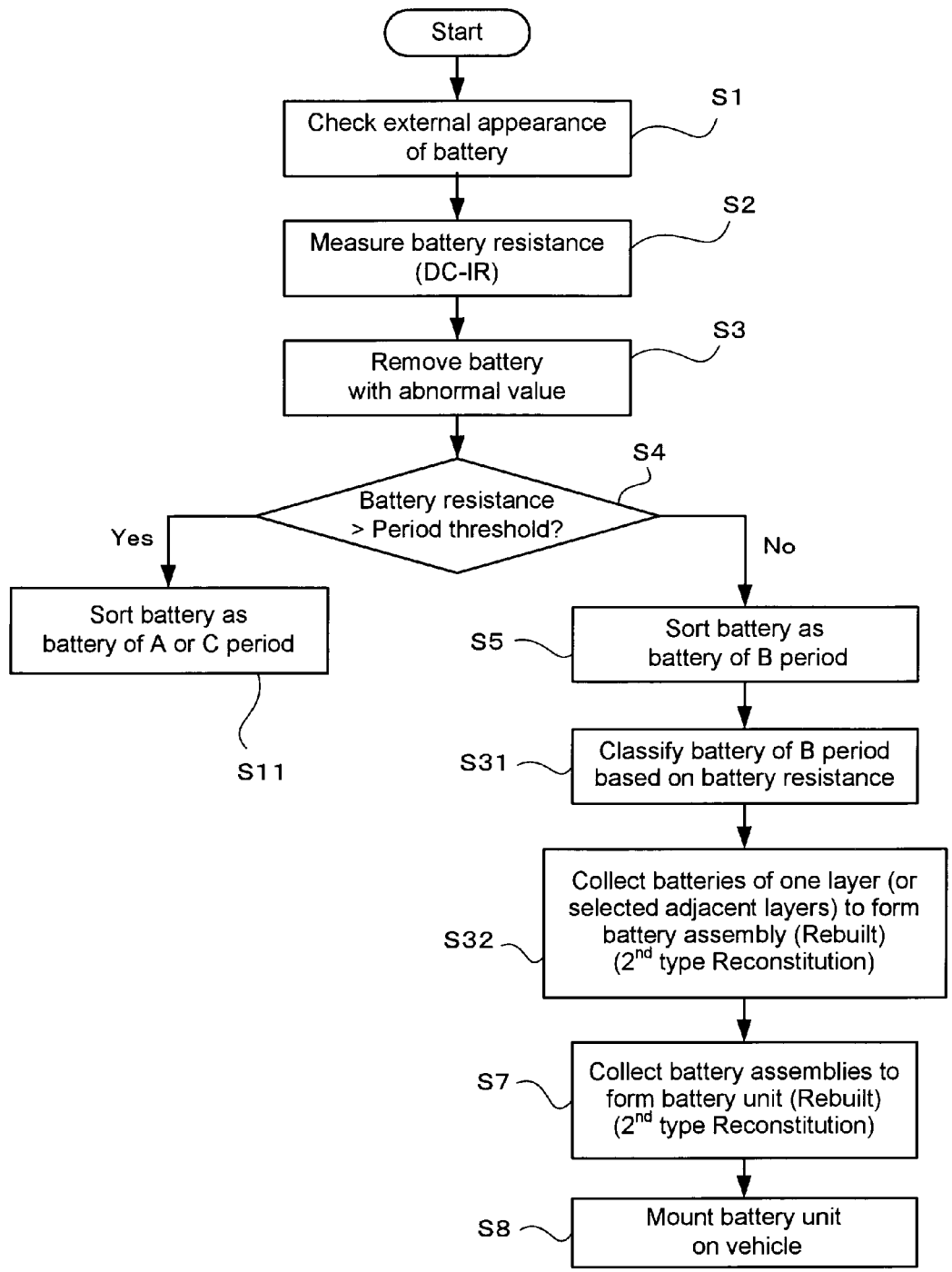
FIG. 6 is a flowchart shoring a flow to classify a battery and manufacture a battery assembly and a battery unit in a third embodiment.

Next, a third embodiment will be described with reference to FIGS. 1, 2 and 6. In the first embodiment described above (see FIG. 3), according to the battery 12 of the B period, the rebuilt battery assembly 21 and the rebuilt battery unit 31 are manufactured, and furthermore, are mounted on the vehicle 41 in accordance with Steps S5 to S8.

On the other hand, in the third embodiment, the battery 12 of the B period is sorted in Steps S4 and S5, and then, is further classified based on a battery resistance BRD. Thereafter, a rebuilt battery assembly 221 and a rebuilt battery unit 231 are manufactured and are further mounted on a vehicle 241.

Therefore, portions different from the first embodiment will be mainly described below, while the explanation of the same portions as those in the first embodiment will be omitted or simplified.

Also in the third embodiment, the same battery 1 as that in the first embodiment is used for rebuilt. In other words, in the same manner as the first embodiment, an external appearance of the battery 1 is checked in Step S1 and a battery 10 having a defect is removed. Furthermore, a battery resistance BRD is measured (Step S2) and the battery 10 from which an abnormal value is detected is removed in Step S3.

In Step S4, subsequently, the measured battery resistance BRD is compared with a period threshold Rp. If the battery resistance BRD is smaller than the period threshold Rp (No), the processing proceeds to Step S5 in which the battery 11 is distinguished to be the battery 12 of the B period.

Differently from the first embodiment, subsequently, the processing proceeds to Step S31 in which the battery 12 of the B period is classified based on a magnitude of the battery resistance BRD (for example, is classified into three layers, i.e., batteries 12A, 12B and 12C, in ascending order of the battery resistance BRD). According to the battery 12 of the B period, a range of a resistance variation DR of the battery 12 in a used time X is shown in a double arrow of FIG. 2. Thus, the battery 12 of the B period has the variation DR in the battery resistance BRD. By classifying each battery 12 into a plurality of layers (three layers in the present example) based on the magnitude of the battery resistance BRD, it is possible to further classify into the batteries 12A, etc. having the battery resistances BRD close to each other.

In Step S32, next, from the batteries classified in three layers, the batteries (for example, the batteries 12A) belonging to one of the three layers are collected to form the rebuilt battery assembly 221 (221A, 221B and 221C) (see FIG. 1(d)). For this reason, the variation in the characteristics between the batteries used in the battery assembly is further reduced and it is possible to prevent a drawback such as overvoltage or overcharge applied to some of the batteries, which is caused by the resistance variation DR between the batteries. In addition, the battery of the B period is used. Even if the battery is used, therefore, the characteristics of the respective batteries are less changed so that they can be formed into the rebuilt battery assembly 221 having stable characteristics.

In the case in which the number of the batteries allowed to be assembled in a single layer is insufficient, it is also possible to constitute the rebuilt battery assembly by assembling the batteries in adjacent layers, for example, the battery 12A and the battery 12B or the battery 12B and the battery 12C.

Then, the processing proceeds to Step S7 in which the rebuilt battery assemblies 221 are used to form the rebuilt battery unit 231 in the same manner as in the first embodiment (see FIG. 1(*e*)).

The battery unit 231 has a small variation in the characteristics between the batteries used therein and it is possible to prevent a drawback such as overvoltage or overcharge applied to some of the batteries (or the rebuilt battery assembly 221), which is caused by the resistance variation DR between the batteries.

In Step S8, furthermore, the rebuilt battery unit 231 is incorporated into the vehicle 241 in the same manner as in the first embodiment (see FIG. 1(*f*)). Thus, it is possible to manufacture the vehicle 241 provided with the rebuilt battery unit 231 (the rebuilt battery assembly 221). Since the vehicle 241 is the same as the vehicle 41 except for the battery unit 231, description will be omitted.

The vehicle 241 is provided with the rebuilt battery unit 231. Therefore, the vehicle 241 can be more inexpensive as compared with the case in which a brand-new battery (battery unit) is used. In addition, it is possible to effectively utilize the used secondary battery 1.

In the third embodiment, Step S2 corresponds to a resistance measuring step, Step S4 corresponds to a resistance distinguishing step, Step S31 corresponds to a resistance classifying step, and Steps S32 and S7 correspond to a second type reconstituting step.

Fourth Embodiment

Next, a fourth embodiment will be described with reference to FIGS. 1, 2, and 7 to 9. In the first embodiment described above (see FIG. 3), according to the battery 12 of the B period, the rebuilt battery assembly 21 and the rebuilt battery unit 31 are manufactured, and furthermore, are mounted on the vehicle 41 in accordance with Steps S5 to S8.

In the third embodiment, moreover, the battery 12 of the B period is sorted in Steps S4 and S5, and then, is further classified based on a battery resistance BRD. Thereafter, a rebuilt battery assembly 221 and a rebuilt battery unit 231 are manufactured and are further mounted on a vehicle 241.

On the other hand, in the fourth embodiment, the battery 12 of the B period is sorted in Steps S4 and S5, and then, is further classified in the same manner as in the third embodiment. Although the battery 12 is classified based on the magnitude of the battery resistance BRD in the third embodiment, it is instead classified based on a discharging time DT of the battery.

Therefore, portions different from the first and third embodiments will be mainly described below, while the explanation of the same portions as those in the first to third embodiments will be omitted or simplified.

First of all, a relationship between a battery temperature BT and the battery resistance BRD (a temperature characteristic of the battery resistance BRD) in the battery 1 (12) will be described with reference to FIG. 7. As is apparent from a graph of FIG. 7, the battery 1, an on-vehicle nickel-metal hydride battery can be used in a usable temperature range UTR (−30° C. to 60° C. in the battery 1).

In a temperature region (a high temperature region H to be described later) from a temperature (10° C.) slightly lower than an ordinary temperature (20° C.) to approximately 60° C. within the range, the battery resistance BRD of the battery 1 (an internal resistance of the battery) is lower than that in a lower temperature region. The reason is that a battery reaction sufficiently occurs in the battery 1. There is a tendency such that, although a fluctuation in the battery resistance BRD is small even if the battery temperature BT is varied in this temperature region, a battery resistance BTD is reduced linearly with a rise in the battery temperature BT.

On the other hand, when the battery temperature BT reaches a temperature range of −20° C. or less (a low temperature region L to be described later), for example, −30° C., the battery resistance BRD has a magnitude equal to or more than three times (five times in the present example) as high as the battery resistance BRD in the high temperature region H by a rise in a resistance of an electrolyte. In addition, the battery 1 has a characteristics in which the battery resistance BRD is rapidly increased with a drop in the battery temperature BT.

Within a temperature range of 10° C. to −20° C. (a middle temperature region M to be described later), moreover, the battery resistance BRD is acceleratively increased when the battery temperature BT is lowered.

Figure 7:
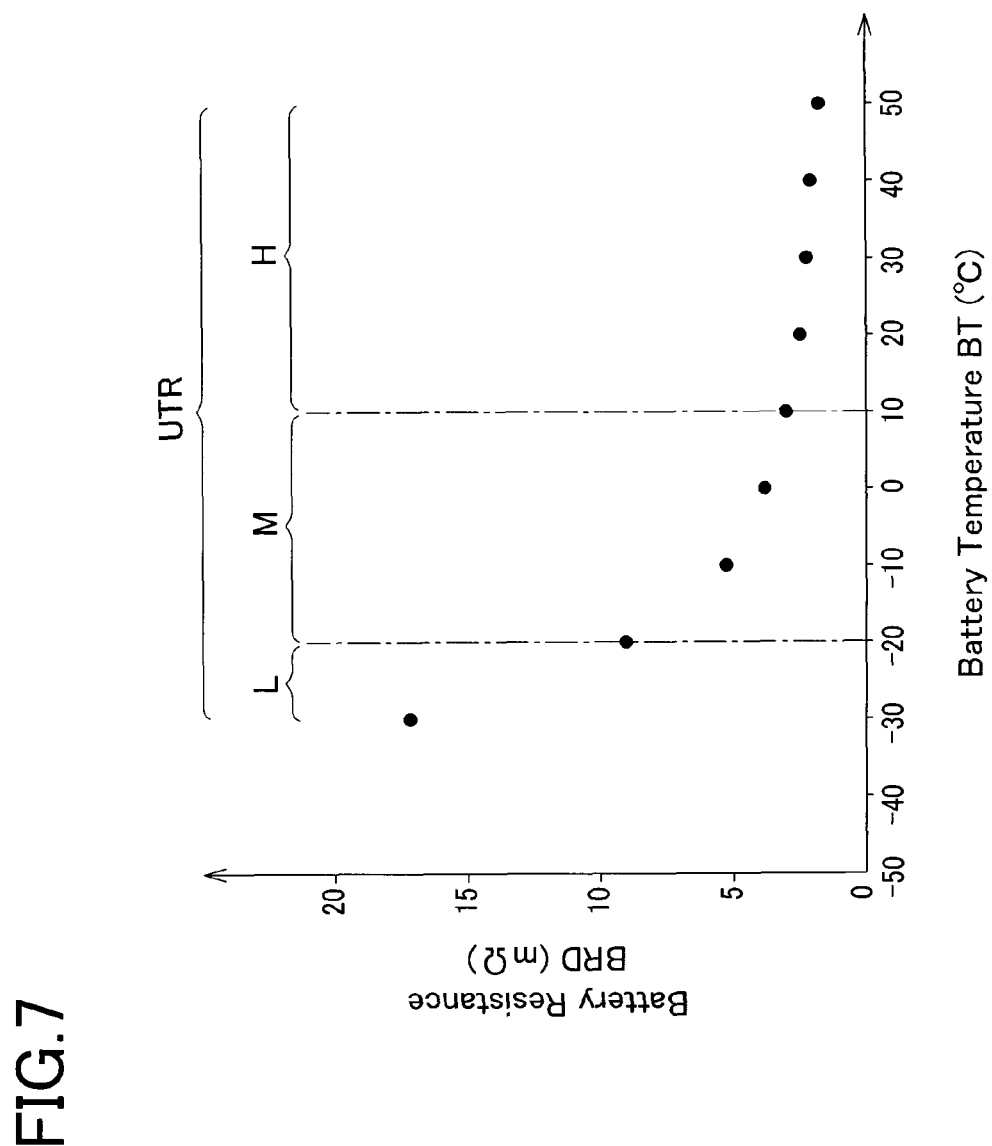
FIG. 7 is a graph showing a relationship between battery temperature and DC resistance of a battery.

As shown in FIG. 7, therefore, a temperature region of 10° C. to 60° C. in which the battery resistance BRD is linearly dropped with a rise in the temperature in the battery 1 is set to be the high temperature region H. Moreover, a temperature region of −20° C. or less (−30° C. to −20° C.) is set to be the low temperature region L. Furthermore, the temperature region of −20° C. to +10° C. therebetween is set to be the middle temperature region M.

At temperature of −30° C. or less, the resistance of the electrolyte of the battery 1 is increased so that the battery 1 is hard to be used. When the temperature exceeds 60° C., moreover, the battery 1 is hard to be charged and also to be used.

Figure 8:
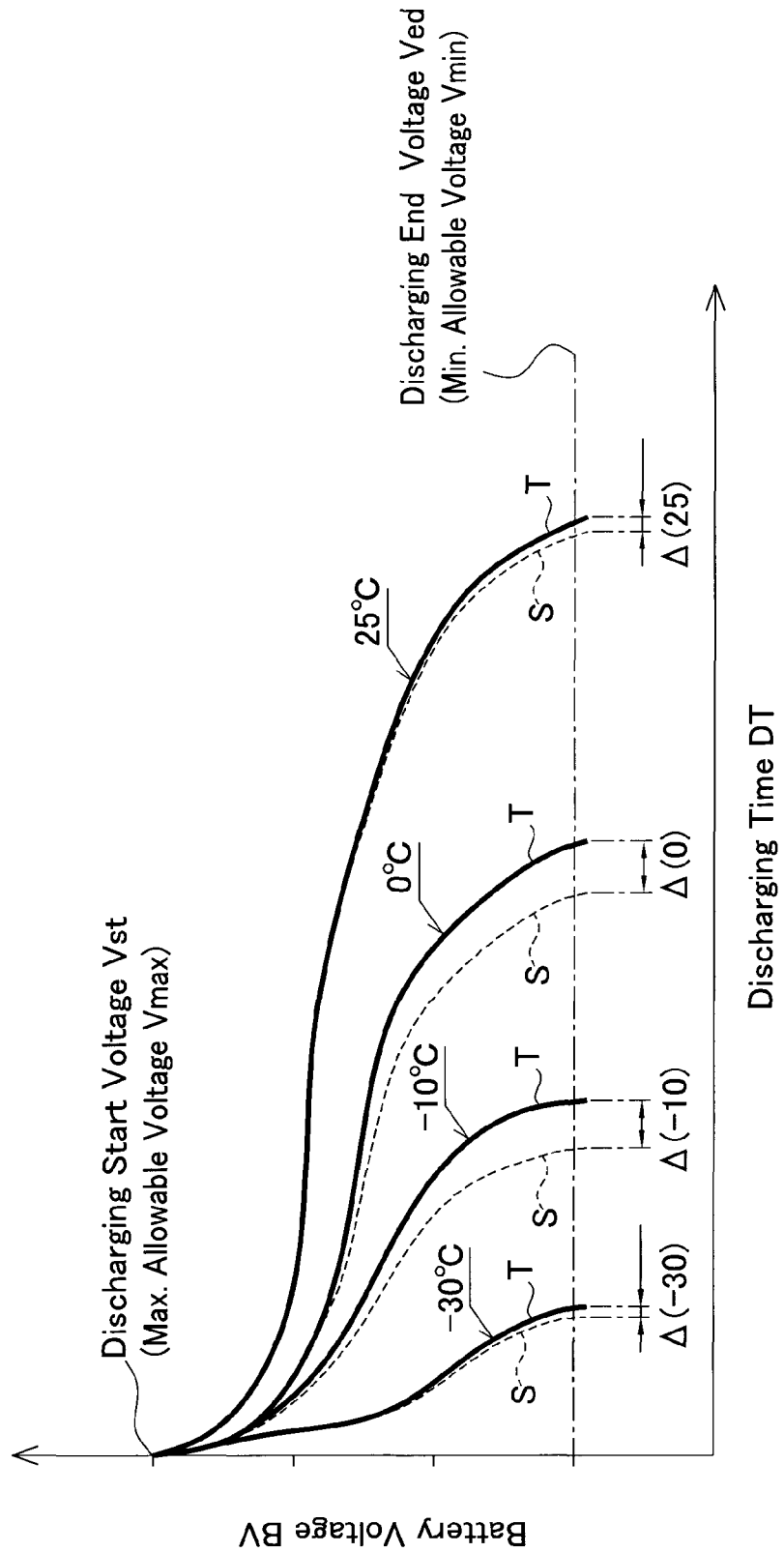
FIG. 8 is a graph showing changes in battery voltage of a battery discharged at a constant power from a full charging state to a minimum allowable voltage, at different battery temperatures.

Furthermore, FIG. 8 shows a chronological change of a battery voltage BV of the battery 1(12) seen when this battery 1(12) is charged once to a full charging state (SOC 100%: Battery voltage BV=Maximum allowable voltage Vmax) and then discharged at a constant power of 10 C at a maximum through a charging and discharging device until a terminal based voltage (an inter-terminal voltage) of the battery (the battery voltage BV) decreases to a minimum allowable voltage Vmin (SOC 0%). As is easily understood from FIG. 8, it is apparent that a relationship between a discharging time DT and the battery voltage BV greatly depends on the battery temperature BT. The lower the temperature BT is, the more the battery voltage BV is dropped remarkably. In other words, the battery voltage BV is dropped in a shorter time as the battery temperature BT is lower.

Also when the batteries 12 (indicated as symbols S and T) of the same B period are used as shown in a broken line and a solid line of FIG. 8, furthermore, there may be some cases in which the relationship between the discharging time DT and the battery voltage BV has a difference as shown in a solid line (a battery T) and a broken line (a battery S)

depending on the resistance variation DR in the battery. Furthermore, it is apparent that a discharging time difference Δ indicated as Δ(25), Δ(0), Δ(−10) and Δ(−30) has a temperature dependency by a comparison between the batteries S and T in the discharging time DT from the start of the discharge to reach the minimum allowable voltage Vmin. More specifically, the discharging time difference Δ is relatively small as shown in Δ(25) in the high temperature region H (10° C. to 50° C.). Similarly, the discharging time difference A is relatively small as shown in Δ(−30) in the low temperature region L (−30° C. to −20° C.). However, it is apparent that the discharging time difference Δ is relatively large as shown in Δ(0) and Δ(−10) in the middle temperature region M (−20° C. to +10° C.).

It is supposed that the temperature dependency is occurred in the discharging time difference Δ for the following reasons. In the high temperature region H, the battery resistance BRD has a small absolute value and the variation in the resistance is unlikely to appear as a voltage difference even if the battery is deteriorated. In the low temperature region L, moreover, the resistance of the electrolyte in the battery resistance BRD is predominant so that a contribution of an electrode resistance is reduced. Therefore, a significance of the deterioration in the battery cannot be found. On the other hand, in the middle temperature region M, the resistance of the electrode in the battery resistance BRD is predominant and the variation in the deterioration in the characteristics of the electrode is likely to appear.

From the result, accordingly, it is apparent that a difference between battery characteristics which cannot be discriminated by the battery resistance BRD measured by the DC-IR method can be detected and classified by discharging the battery 1 with the battery temperature BT set to be a specific temperature in the middle temperature region M.

In FIG. 8, from a full charging state (SOC 100%: a maximum allowable voltage Vmax), the discharge is carried out with a discharging start voltage Vst until the battery voltage BV reaches a discharging end voltage Ved (SOC 0%: a minimum allowable voltage Vmin).

As the discharging start voltage Vst for starting the discharge, however, it is preferable to select a value within a highest voltage range, that is uppermost ⅕ of the allowable voltage range, which corresponds to a topmost range in five ranges obtained by dividing, into five parts, the allowable voltage range (Vmin to Vmax) from the minimum allowable voltage Vmin to the maximum allowable voltage Vmax. By starting the discharge with a value close to the maximum allowable voltage Vmax (a full charging (SOC: 100%) voltage), it is possible to reflect, on the discharging time DT, the characteristics of the battery having a relatively large charging quantity. Accordingly, it is particularly preferable that the discharging start voltage Vst has a voltage value of the maximum allowable voltage Vmax (the full charging (SOC: 100%)).

Moreover, it is preferable to select, as the discharging end voltage Ved for ending the discharge, a value within a lowest voltage range, that is lowermost ⅕ of the allowable voltage range, which corresponds to the lowermost range in the five ranges obtained by dividing the allowable voltage range (Vmin to Vmax) into five parts. By discharging to have a value close to the minimum allowable voltage Vmin (a full discharging (SOC: 0%) voltage), it is possible to reflect, on the discharging time DT, the characteristics of the battery having a relatively small charging quantity. Accordingly, it is particularly preferable that the discharging end voltage Ved has a voltage value of the minimum allowable voltage Vmin (the full discharging (SOC: 0%)).

In the present embodiment, furthermore, a current flows in discharging is set to be 10 C or less. When a large current flows, the discharge is ended in a short time. For this reason, precision in the measurement of the discharging time DT is lowered so that the discharging time differences A are unlikely to be properly compared. Moreover, the reason is that the influence of a voltage drop due to the resistance of the electrolyte, which is caused by the discharge of the large current is great and change in the discharging time DT caused by the deterioration in the characteristics of the battery electrode is hard to be grasped.

Also in the fourth embodiment, the battery 1 same as that in each of the first and third embodiments is used for rebuilt. An external appearance of the battery 1 is checked in Step S1 in FIG. 9 and a battery 10 having a defect is removed. Furthermore, a battery resistance BRD is measured (Step S2) and the battery 10 from which an abnormal value is detected is removed in Step S3.

In Step S4, subsequently, the measured battery resistance BRD is compared with a period threshold Rp. If the battery resistance BRD is smaller than the period threshold Rp (No), the processing proceeds to Step S5 in which the battery 11 is distinguished to be the battery 12 of the B period.

Figure 9:
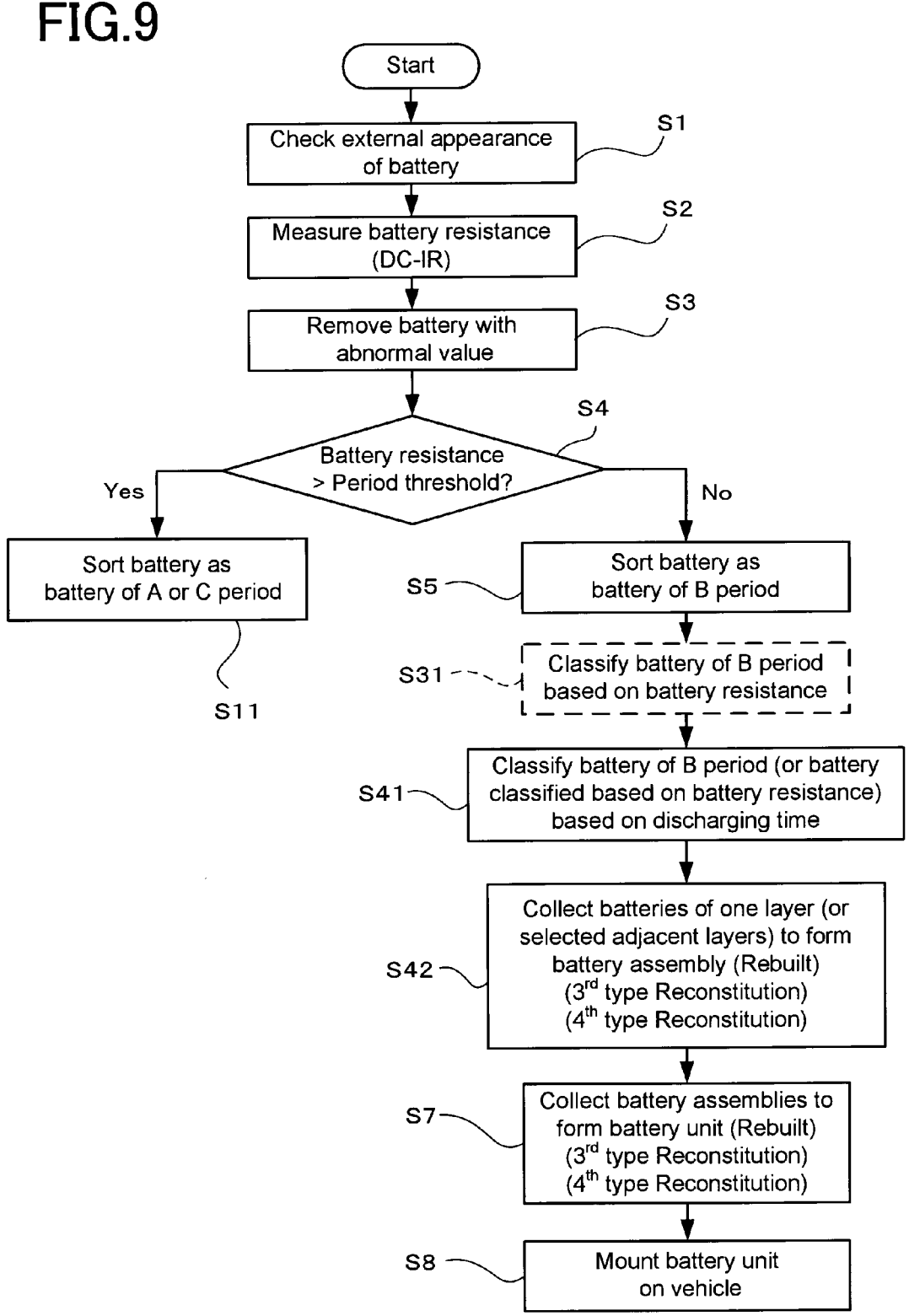
FIG. 9 is a flowchart shoring a flow to classify a battery and manufacture a battery assembly and a battery unit in a fourth embodiment.

In place of Step S31 according to the third embodiment (Step S31 shown in a broken line of FIG. 9 is not carried out in the fourth embodiment), then, the battery 12 of the B period is classified based on the discharging time DT in Step S41. More specifically, the battery voltage BV is preset to be a 1.7 V/cell (the discharging start voltage Vst) which is a full charging voltage, and the battery temperature BT is set to be 0° C. and the discharge is carried out in a 60 W/cell constant power discharge through a charging and discharging device to measure the discharging time DT required for the battery voltage BV to reach the discharging end voltage Ved of 0.9 V/cell, thereby classifying into a plurality of layers (for example, three layers of batteries 12P, 12Q and 12R in ascending order of the discharging time DT).

By the classification, it is possible to properly detect a difference in the battery characteristics in an environment of the middle temperature region M having a relatively low temperature which cannot be found by the battery resistance BRD at an ordinary temperature, thereby classifying each battery into a plurality of layers. Thus, it is possible to precisely collect the used secondary batteries having similar characteristics. In the use of the battery in the environment of the middle temperature region M in which the battery resistance BRD is slightly increased at a relatively low temperature, particularly, it is possible to sort the batteries having the similar characteristics. In the actual use of the battery 1 in the environment of the middle temperature region M, therefore, the difference between the battery characteristics is unlikely to appear so that it is possible to easily constitute a battery assembly having a stable characteristics (a small battery pack) or a battery unit assembled from those battery assemblies (a large battery pack).

Then, the processing proceeds to Step S42 in which the batteries (for example, the battery 12P) belonging to one of the plurality of layers (three layers in the present example) are collected to form a rebuilt battery assembly 321 (321P, 321Q and 321R) (see FIG. 1(d)). Therefore, a variation in the characteristics between the batteries used in the battery assembly is particularly small and it is possible to prevent a drawback such as overvoltage or overcharge applied to some of the batteries, which is caused by the variation in the characteristics between the batteries. In addition, the battery of the B period is used. Even if the battery is used, therefore, change in the characteristics of the respective batteries is small so that they can be formed into the rebuilt battery assembly 321 having a stable characteristic.

In the use in the environment of the middle temperature region M, particularly, the batteries 12P having similar characteristics are assembled with each other. In the actual use of the battery in the environment of the middle temperature region M, therefore, the difference between the battery characteristics is unlikely to appear so that it is possible to constitute a battery assembly 321 having a stable characteristic.

In the case in which the number of the batteries allowed to be assembled in a single layer is insufficient, it is also possible to constitute the rebuilt battery assembly 321 by assembling the batteries in the adjacent layers, for example, the battery 12P and the battery 12Q or the battery 12Q and the battery 12R.

Then, the processing proceeds to Step S7 in which the rebuilt battery assemblies 321 are used to form the rebuilt battery unit 331 in the same manner as in the first and third embodiments (see FIG. 1(e)).

The battery unit 331 has a particularly small variation in the characteristics between the batteries used therein and it is possible to prevent a drawback such as overvoltage or overcharge applied to some of the batteries (or the rebuilt battery assembly 321), which is caused by the variation in the characteristics between the batteries. In the actual use of the battery in the environment of the middle temperature region M, particularly, the difference between the battery characteristics is unlikely to appear so that it is possible to constitute the battery unit 331 having a stable characteristic.

In Step S8, furthermore, the rebuilt battery unit 331 is incorporated into a vehicle 341 in the same manner as in the first and third embodiments (see FIG. 1(f)). Thus, it is possible to manufacture the vehicle 341 provided with the rebuilt battery unit 331 (the rebuilt battery assembly 321). Since the vehicle 341 is the same as the vehicle 41 except for the battery unit 331, description of the vehicle 341 will be omitted.

Since the vehicle 341 is also provided with the rebuilt battery unit 331, the vehicle 341 can be more inexpensive as compared with the case in which a brand-new battery (battery unit) is used. In addition, it is possible to effectively utilize the used secondary battery 1.

The aforementioned fourth embodiment shows an example without Step 31 indicated in the broken line in FIG. 9 but with Step 41 in which the batteries 12 of the B period are classified based on the discharging time DT. Alternatively, instead of omitting Step 31 indicated by the broken line in FIG. 9, two classifications in Steps 31 and 41 may be performed. Specifically, the batteries 12 of the B period are first classified on the battery resistance BRD in Step 31 and then each classified battery is further classified based on the discharging time DT in Step 41.

In the fourth embodiment, Step 2 corresponds to the resistance measuring step, Step 4 corresponds to the resistance distinguishing step, Step 41 corresponds to the discharging-time classifying step, and Step 42 and Step 7 correspond to the third type reconstituting step or the fourth type reconstituting step.

Fifth Embodiment

Figure 10:
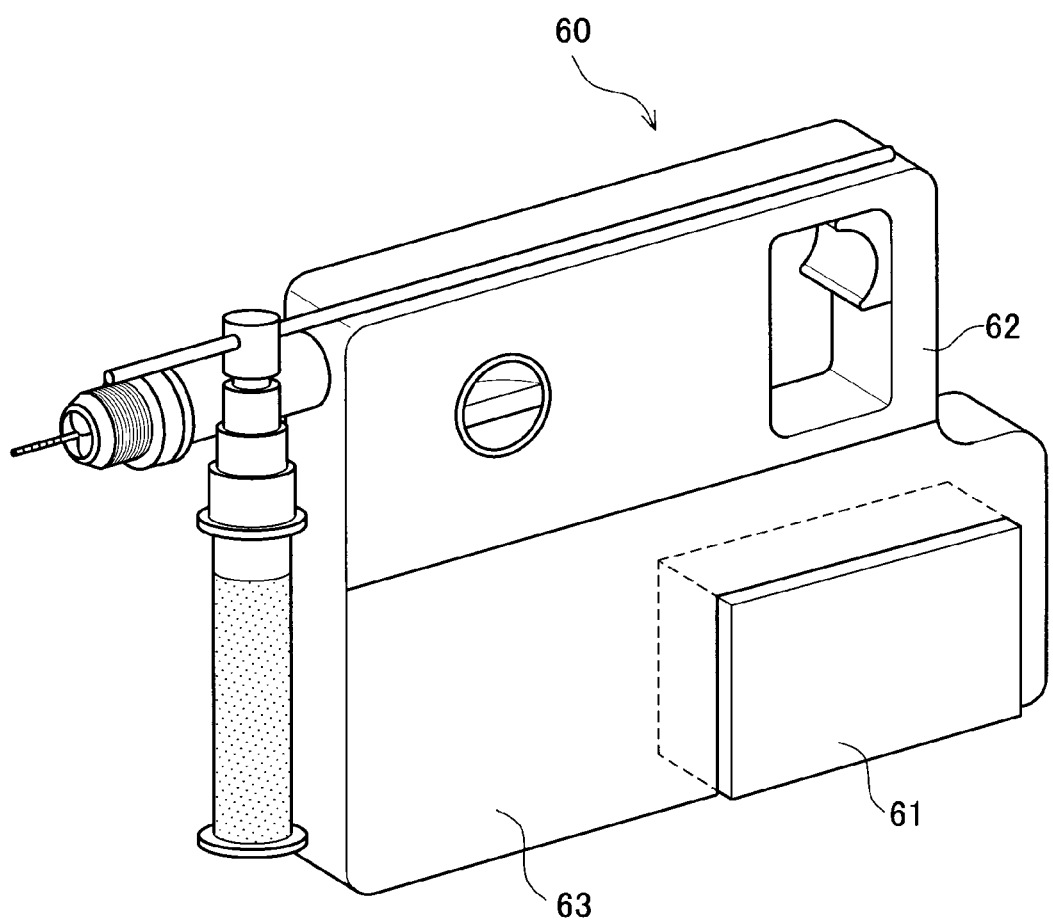
FIG. 10 is an explanatory view showing an impact driver in which a rebuilt battery assembly is mounted.

A fifth embodiment will be explained below. A hammer drill 60 in the fifth embodiment is a battery operated device on which a rebuilt battery assembly 61 reconstituted by collecting the batteries 12 of the first embodiment is mounted. As shown in FIG. 10, this hammer drill 60 accommodates the rebuilt battery assembly 61 on a bottom 63 of a main body 62. This battery assembly 61 is utilized as an energy source to drive the drill.

This hammer drill 60 provided with the above rebuilt battery assembly 61 can be inexpensive as compared with the configuration using a battery assembly constituted by brand-new batteries and further effective utilization of the batteries can be achieved.

The invention is described in the above first to fourth embodiments, but is not limited thereto. The invention thus may be embodied in other specific forms without departing from the essential characteristics thereof.

For instance, the aforementioned first to fifth embodiments exemplify the nickel-metal hydride secondary batteries. Instead thereof, the present invention may also be applied to other kinds of secondary batteries such as a lithium ion secondary battery and a nickel cadmium battery.

The first to fifth embodiments further exemplify the rectangular batteries. As another alternative, the present invention may be applied to cylindrical batteries. Although the above embodiments show the battery including a laminated-type power generating element, the invention may also be applied to a battery including a wound-type power generating element. Furthermore, although the DC resistance of the battery measured by the DC-IR method is used as the battery resistance, an AC resistance of a battery measured by an AC-IR method may be used instead.

REFERENCE SIGNS LIST

1 Battery (Used secondary battery)
11, 12, 13, 14, 15 Sorted (Classified) Battery
21, 121, 221, 221A, 221B, 221C, 321, 321P, 321Q, 321R Rebuilt Battery Assembly (Rebuilt battery pack)
31, 131, 231, 331 Rebuilt Battery Unit (Rebuilt battery pack)
41, 141, 241, 341 Vehicle
42 Engine
43 Front Motor
44 Rear Motor
45 Vehicle Body
46 Cable
47 Invertor
60 Hammer Drill (Battery operated device)
61 Battery Pack
62 Main Body (of Hammer drill)
63 Bottom (of Main body)
UBP Used Battery Assembly
UAB Used Battery Unit
UP Usable Period
A A Period (Initial-stage high-resistance period: Initial stage)
B B Period (Middle-stage low-resistance period: Middle stage)
C C Period (Ending-stage high-resistance period: Ending stage)
UT Used Time (of battery)
BRD Battery Resistance
Rmin Minimum Allowable Resistance Value
Rmax Maximum Allowable Resistance Value
Rp Period Threshold (of battery resistance)
Ri Initial Resistance Value
DR Resistance Variation
BT Battery Temperature
UTR Usable Temperature Range (of battery)
H High Temperature Region
M Middle Temperature Region
L Low Temperature Region Vst Discharging Start Voltage
Ved Discharging End Voltage
Vmax Maximum Allowable Voltage
Vmin Minimum Allowable Voltage
BV Battery Voltage
DT Discharging Time
Δ Difference in Discharging Time
S, T Battery of B Period
S2 Resistance Measuring Step
S4 Resistance Distinguishing Step
S12 Period Distinguishing Step
S31 Resistance Classifying Step
S41 Discharging-time Classifying Step
S6, S7 First Type Reconstituting Step
D32, S7 Second Type Reconstituting Step
S42, S7 Third Type Reconstituting Step, Fourth Type Reconstituting Step

The invention claimed is:

1. A method for sorting a used secondary battery having been already used, the battery having characteristics such that
   in an initial stage of a usable period, a battery resistance is gradually reduced and an initial-stage high-resistance period having a relatively high battery resistance appears,
   in a middle stage of the usable period, a middle-stage low-resistance period having a relatively loan battery resistance appears, and
   in an ending stage of the usable period, the battery resistance is gradually raised and an ending-stage high-resistance period having a relatively high battery resistance appears,
   wherein the method includes:
   a resistance measuring step of measuring the battery resistance of the used secondary battery; and
   a resistance distinguishing step of distinguishing whether the battery resistance of the used secondary battery is high or low as compared with a period threshold identifying whether the used secondary battery is present in one of the initial-stage high-resistance period or ending-stage high-resistance period and the middle-stage low-resistance period.

2. The method for sorting a used secondary battery according to claim 1, further including a period distinguishing step of distinguishing whether the used secondary battery having the higher battery resistance than the period threshold belongs to the initial-stage high-resistance period or the ending-stage high-resistance period based on used history information of the used secondary battery.

3. The method for sorting a used secondary battery according to claim 1, further including a resistance classifying step of further classifying the used secondary battery having the lower battery resistance than the period threshold into a plurality of layers based on a magnitude of the battery resistance.

4. The method for sorting a used secondary battery according to claim 1, wherein
   the used secondary battery has characteristics such that
   in a usable temperature range of the battery,
   a DC resistance of the battery is increased as a temperature of the battery is lowered, and
   a change in the DC resistance due to the temperature is small in a high temperature region having a relatively high temperature, and
   a change in the DC resistance due to the temperature is large in a low temperature region having a relatively low temperature, and the DC resistance in the low temperature region is equal to or more than three times as high as the DC resistance in the high temperature region, and
   the DC resistance is acceleratively increased as the temperature of the battery is lowered in a middle temperature region between the high temperature region and the low temperature region, and
   the method includes a discharging-time classifying step of further classifying, in an environment of the middle temperature region, the used secondary battery having the smaller battery resistance than the period threshold, into a plurality of layers based on a length of a discharging time of constant power discharging or constant current discharging which is started at a predetermined discharging start voltage within a highest voltage range defined as an uppermost $\frac{1}{5}$ of an allowable voltage range ranging from a minimum allowable voltage to a maximum allowable voltage, and ended at a predetermined discharging end voltage within a lowest voltage range defined as a lowermost $\frac{1}{5}$ of the allowable voltage range.

5. A rebuilt battery pack reconstituted by collecting a plurality of used secondary batteries having been already used, the batteries having characteristics such that
   in an initial stage of a usable period, a battery resistance is gradually reduced and an initial-stage high-resistance period having a relatively high battery resistance appears,
   in a middle stage of the usable period, a middle-stage low-resistance period having a relatively low battery resistance appears, and
   in an ending stage of the usable period, the battery resistance is gradually raised and an ending-stage high-resistance period having a relatively high battery resistance appears,
   wherein each of the used secondary batteries is distinguished to be in the middle-stage low-resistance period by the method for sorting a used secondary battery according to claim 1.

6. A rebuilt battery pack reconstituted by collecting a plurality of used secondary batteries having been already used, the batteries having characteristics such that
   in an initial stage of a usable period, a battery resistance is gradually reduced and an initial-stage high-resistance period having a relatively high battery resistance appears,
   in a middle stage of the usable period, a middle-stage low-resistance period having a relatively low battery resistance appears, and
   in an ending stage of the usable period, the battery resistance is gradually raised and an ending-stage high-resistance period having a relatively high battery resistance appears,
   wherein each of the used secondary batteries is distinguished to be in the initial-stage high-resistance period by the method for sorting a used secondary battery according to claim 2.

7. A rebuilt battery pack reconstituted by collecting a plurality of used secondary batteries having been already used, the batteries having characteristics such that
   in an initial stage of a usable period, a battery resistance is gradually reduced and an initial-stage high-resistance period having a relatively high battery resistance appears,
   in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein the used secondary batteries belong to one layer or some adjacent layers of the plurality of layers classified in the resistance classifying step according to claim 3.

8. A rebuilt battery pack reconstituted by collecting a plurality of used secondary batteries having been already used, the batteries having characteristics such that in an initial stage of a usable period, a battery resistance is gradually reduced and an initial-stage high-resistance period having a relatively high battery resistance appears, in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein the used secondary batteries belong to one layer or some adjacent layers of the plurality of layers classified in the discharging-time classifying step according to claim 4.

9. A rebuilt battery pack reconstituted by collecting a plurality of used secondary batteries having been already used, the batteries having characteristics such that in an initial stage of a usable period, a battery resistance is gradually reduced and an initial-stage high-resistance period having a relatively high battery resistance appears, in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein each of the used secondary batteries belongs to the middle-stage low-resistance period.

10. A vehicle on which the rebuilt battery pack according to claim 5 is mounted, the vehicle using electric energy of the rebuilt battery pack for a whole or partial power source.

11. A battery operated device on which the rebuilt battery pack according to claim 5 is mounted, the battery operated device using the rebuilt battery pack as at least one of energy sources.

12. A method of manufacturing a rebuilt battery pack reconstituted by collecting a plurality of used secondary batteries having been already used, the batteries having characteristics such that in an initial stage of a usable period, a battery resistance is gradually reduced and an initial-stage high-resistance period having a relatively high battery resistance appears, in a middle stage of the usable period, a middle-stage low-resistance period having a relatively low battery resistance appears, and in an ending stage of the usable period, the battery resistance is gradually raised and an ending-stage high-resistance period having a relatively high battery resistance appears, wherein the method includes:

a resistance distinguishing step of distinguishing whether the battery resistance of the used secondary battery is high or low as compared with a period threshold identifying whether the used secondary battery is present in one of the initial-stage high-resistance period or ending-stage high-resistance period and the middle-stage low-resistance period; and a first type reconstituting step of collecting the used secondary batteries having the lower battery resistance than the period threshold to reconstitute the battery pack.

13. The method of manufacturing a rebuilt battery pack according to claim 12, further including:

a resistance classifying step of classifying the used secondary batteries having a lower battery resistance than the period threshold into a plurality of layers based on a magnitude of the battery resistance; and a second type reconstituting step, in place of the first type reconstituting step, of collecting the used secondary batteries belonging to one layer or some adjacent layers of the plurality of layers classified by the battery resistance to reconstitute a battery pack.

14. The method of manufacturing the rebuilt battery pack according to claim 12, wherein the used secondary battery has characteristics such that in a usable temperature range of the battery, a DC resistance of the battery is increased as a temperature of the battery is lowered, and a change in the DC resistance due to the temperature is small in a high temperature region having a relatively high temperature, and a change in the DC resistance due to the temperature is large in a low temperature region having a relatively high temperature, and the DC resistance in the low temperature region is equal to or more than three times as high as the DC resistance in the high temperature region, and the DC resistance is acceleratively increased as the temperature of the battery is lowered in a middle temperature region between the high temperature region and the low temperature region, the method includes:

a discharging-time classifying step of further classifying, in an environment of the middle temperature region, the used secondary batteries having the smaller battery resistance than the period threshold or classified in the resistance classifying step, into a plurality of layers based on a length of a discharging time of constant power discharging or constant current discharging which is started at a predetermined discharging start voltage within a highest voltage range defined as an uppermost ⅕ of an allowable voltage range ranging from a minimum allowable voltage to a maximum allowable voltage, and ended at a predetermined discharging end voltage within a lowest voltage range defined as a lowermost ⅕ of the allowable voltage range; and a third type reconstituting step, provided in place of the first type reconstituting step, of reconstituting the battery pack by collecting the used secondary batteries belonging to one layer or some adjacent layers of the plurality of layers classified based on the length of the discharging time.

15. A vehicle on which the rebuilt battery pack according to claim 6 is mounted, the vehicle using electric energy of the rebuilt battery pack for a whole or partial power source.

16. A vehicle on which the rebuilt battery pack according to claim 7 is mounted, the vehicle using electric energy of the rebuilt battery pack for a whole or partial power source.

17. A vehicle on which the rebuilt battery pack according to claim 8 is mounted, the vehicle using electric energy of the rebuilt battery pack for a whole or partial power source.

18. A vehicle on which the rebuilt battery pack according to claim 9 is mounted, the vehicle using electric energy of the rebuilt battery pack for a whole or partial power source.

\* \* \* \* \*